United States Patent
Sivanesan et al.

(10) Patent No.: US 11,158,194 B2
(45) Date of Patent: Oct. 26, 2021

(54) TECHNOLOGIES FOR VEHICLE-TO-VEHICLE COMMUNICATIONS FOR AUTONOMOUS VEHICLES

(71) Applicant: Intel Corporation, Santa Clara, CA (US)

(72) Inventors: Kathiravetpillai Sivanesan, Portland, OR (US); Yaser Fouad, North Plains, OR (US); Vesh Raj Sharma Banjade, Portland, OR (US); Satish Jha, Portland, OR (US); Sami Mumtaz, Morelia (MX)

(73) Assignee: Intel Corporation, Santa Clara, CA (US)

( * ) Notice: Subject to any disclaimer, the term of this patent is extended or adjusted under 35 U.S.C. 154(b) by 107 days.

(21) Appl. No.: 16/370,247

(22) Filed: Mar. 29, 2019

(65) Prior Publication Data

US 2019/0251848 A1    Aug. 15, 2019

(51) Int. Cl.

| G08G 1/00 | (2006.01) |
| G05D 1/02 | (2020.01) |
| H04W 4/08 | (2009.01) |
| H04W 76/14 | (2018.01) |
| H04W 4/46 | (2018.01) |
| H04W 84/00 | (2009.01) |

(52) U.S. Cl.
CPC .............. *G08G 1/22* (2013.01); *G05D 1/021* (2013.01); *G05D 1/0293* (2013.01); *H04W 4/08* (2013.01); *H04W 4/46* (2018.02); *H04W 76/14* (2018.02); *H04W 84/00* (2013.01); *G05D 2201/0213* (2013.01)

(58) Field of Classification Search
CPC ................. G05D 1/021; G05D 1/0293; G05D 2201/0213; G08G 1/22; H04L 5/0007; H04L 5/0048; H04W 28/16; H04W 48/12; H04W 48/16; H04W 4/08; H04W 4/46; H04W 74/08; H04W 76/14; H04W 76/27; H04W 84/00; H04W 84/18; H04W 84/20
See application file for complete search history.

(56) References Cited

U.S. PATENT DOCUMENTS

| 8,724,472 | B2* | 5/2014 | Huang | ............... H04B 7/15528 370/236 |
| 2002/0114313 | A1* | 8/2002 | Walsh | ............... H04B 7/18584 370/348 |
| 2007/0064669 | A1* | 3/2007 | Classon | ............... H04L 1/1822 370/347 |
| 2008/0165709 | A1* | 7/2008 | Soliman | ............... H04W 16/18 370/280 |

(Continued)

*Primary Examiner* — Babar Sarwar
(74) *Attorney, Agent, or Firm* — Alliance IP, LLC

(57) ABSTRACT

Technologies for facilitating vehicle-to-vehicle (V2V) communications includes an on-board vehicle control system of an autonomous vehicle configured to identify one or more autonomous vehicles with which to communicate and transmit a communication frame usable to indicate that the autonomous vehicle intends to join a cluster of autonomous vehicles defined by the one or more autonomous vehicles. The communication frame includes a structure having a contention channel, a control channel, and a data channel, which are used to communicate requests, intentions, and/or data.

24 Claims, 10 Drawing Sheets

(56) References Cited

U.S. PATENT DOCUMENTS

| | | | | |
|---|---|---|---|---|
| 2010/0256852 A1* | 10/2010 | Mudalige | ............... | G08G 1/22 |
| | | | | 701/24 |
| 2014/0269558 A1* | 9/2014 | Sartori | ............... | H04W 48/16 |
| | | | | 370/329 |
| 2016/0212596 A1* | 7/2016 | Brahmi | ............... | H04W 72/042 |
| 2017/0367117 A1* | 12/2017 | Ahn | ............... | H04W 84/12 |
| 2018/0146471 A1* | 5/2018 | Xu | ............... | H04L 67/12 |
| 2018/0359619 A1* | 12/2018 | Ma | ............... | H04W 84/18 |
| 2019/0053178 A1* | 2/2019 | Merwaday | ............... | H04W 56/002 |
| 2019/0272760 A1* | 9/2019 | Mcquillen | ............... | G08G 1/0968 |
| 2019/0318631 A1* | 10/2019 | Seaman | ............... | G06Q 20/223 |
| 2019/0378418 A1* | 12/2019 | Menadue | ............... | G08G 1/22 |
| 2020/0092685 A1* | 3/2020 | Fehrenbach | ............... | H04B 7/2606 |
| 2020/0304940 A1* | 9/2020 | Thangarasa | ............... | H04W 48/12 |

* cited by examiner

TECHNOLOGIES FOR VEHICLE-TO-VEHICLE COMMUNICATIONS FOR AUTONOMOUS VEHICLES

BACKGROUND

An autonomous vehicle is a vehicle that is capable of sensing a surrounding environment and navigating through the environment to reach a predetermined destination, typically without further input from a vehicle operator. To do so, the autonomous vehicle includes various sensors, such as lasers, radar, global positioning system (GPS), and computer vision technologies. A vehicle control system configured with the autonomous vehicle may process sensor data to identify appropriate navigation paths, obstacles, and relevant signage.

To ensure safety and efficient traffic management in the surrounding environment, autonomous vehicles may collaborate with one another using a variety of communication techniques, such as vehicle-to-vehicle (V2V) communications to transmit messages to one another over a communications channel. In application, a large number of autonomous vehicles are expected to communicate simultaneously in a highly dynamic network topology to communicate critical safety messages, basic safety messages, periodic measurements, sensor data, infotainment content, etc.

However, such communicable content has a wide spectrum of acceptable latency and reliability requirements, as well as required throughput. For example, to address safety concerns, the coverage of V2V communications in non-line of sight situations may be a relatively short distance (e.g., roughly 500 meters). Additionally, certain conditions may require the delivery of critical messages to all vehicles within range as fast as possible, while other conditions may require the delivery of unicast transmissions between vehicles to exchange information in a secure fashion. As such, due to the large number of vehicles travelling on the road at a given time and the highly dynamic network topology associated therewith, interference is expected to be a performance impeding factor that can limit the support for such large number of vehicles and limit the scaling of the required network topology to support such large numbers of vehicles at any given time.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
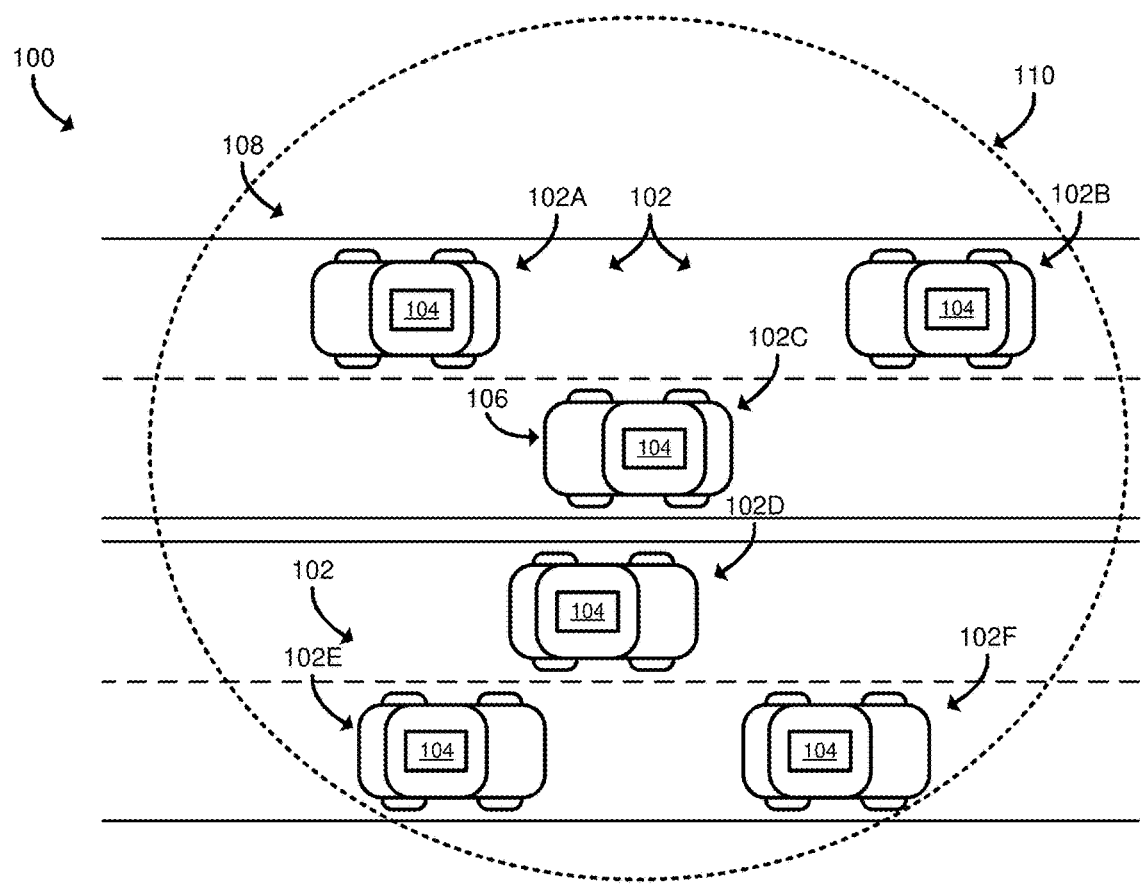
FIG. 1 is a simplified conceptual diagram of at least one embodiment of a system in which a plurality of autonomous vehicles forms a cluster to facilitate vehicle-to-vehicle (V2V) communications.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 includes a plurality of autonomous vehicles 102 that form a cluster 108 to facilitate vehicle-to-vehicle (V2V) communications. To do so, each of the autonomous vehicles 102 includes an on-board vehicle control system 104, which will be described in further detail below. As illustratively shown, the autonomous vehicles 102 include a first autonomous vehicle 102, designated as autonomous vehicle 102A; a second autonomous vehicle 102, designated as autonomous vehicle 102B; a third autonomous vehicle 102, designated as autonomous vehicle 102C; a fourth autonomous vehicle 102, designated as autonomous vehicle 102D; a fifth autonomous vehicle 102, designated as autonomous vehicle 102E; and a sixth autonomous vehicle 102, designated as autonomous vehicle 102F. It should be appreciated that a cluster 108 of autonomous vehicles 102 may include any number of autonomous vehicles 102 that are in the communication range (e.g., within a broadcast coverage boundary 110) of a cluster head 106 of the cluster 108, illustratively shown as the autonomous vehicle 102C in the system 100. In the illustrative embodiment, the autonomous vehicles 102 may be embodied as any type of autonomous or "driver-less" vehicle capable of transporting passengers. However, it should be appreciated that the autonomous vehicles 102 need not be fully autonomous, in other embodiments, as one of skill in the art will recognize that the V2V communication techniques described herein may also be adapted to partially autonomous vehicles.

To facilitate the V2V communications described herein, a vehicle-to-everything (V2X) communication framework is described that includes a channel access mechanism and a centralized frame structure, as well as physical and medium access control (MAC) layer designs. The proposed frame structure described herein is a self-contained structure with generally a 1 ms granularity, during which resource contention, resource reservation, transmission, and corresponding acknowledgement are completed, to support low latency communications in the order of subframe (e.g., 1 millisecond) and is optimized to effectively reduce interference with minimal overhead. To do so, as will be described in further detail below, inter-cluster and intra-cluster resource reservation requests are multiplexed, thereby allowing neighboring clusters to coordinate their resource allocations.

A feedback mechanism is employed by the on-board vehicle control systems 104 to convey channel measurements and acknowledgments to the centralized scheduler, thereby allowing for effective channel utilization. Additionally, the on-board vehicle control systems 104, in the physical layer, are configured to use advanced error correcting codes for the forward error correction to meet a link budget requirement, which is typically a predetermined range coverage requirement (e.g., 100 meters, 250 meters, 500 meters, 1000 meters, etc.). Further, the on-board vehicle control systems 104 are configured to use polar codes and low-density parity-check (LDPC) codes for control channels and data channels, respectively; however, it should be appreciated that alternative codes may be used in alternative embodiments.

To meet the reliability requirements for critical safety messages (e.g., 99% reliability, 99.9% reliability, 99.99% reliability, 99.999% reliability, etc.), the on-board vehicle control systems 104 are configured to use parallel independent pre-emptive transmissions, which are done in frequency. Accordingly, relative to present techniques, such as those technologies in which interference between transmissions of neighboring vehicles in a dense scenario occurs due to many vehicles attempting simultaneous transmissions on the same time-frequency resource, the V2X communication framework as described herein can increase the number of simultaneous transmissions, increase reliability and reduce the incurred delay by enabling inter/intra-cluster resource coordination, enable the utilization of higher spectral efficiencies by providing instant channel measurements and hybrid automatic repeat request (HARQ) feedback, and support both broadcast and unicast data transmissions.

Figure 2:
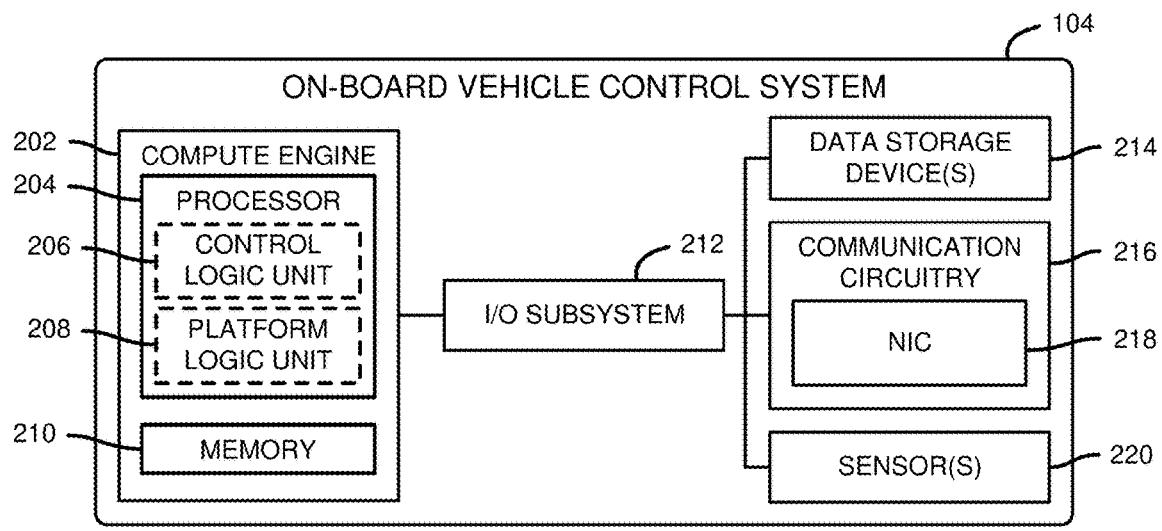
FIG. 2 is a simplified block diagram of at least one embodiment of a vehicle control system on-board one of the autonomous vehicles of the system of FIG. 1.

Referring now to FIG. 2, each on-board vehicle control system 104 may be embodied as any type of computing device capable of performing the functions described herein, such as facilitating the V2V communications. As shown, the illustrative on-board vehicle control system 104 includes a compute engine 202, an input/output (I/O) subsystem 212, one or more data storage devices 214, communication circuitry 216, and one or more sensors 220. Of course, in other embodiments, the on-board vehicle control system 104 may include other or additional components, such as those commonly found in a computer (e.g., a display, peripheral devices, etc.). Additionally, in some embodiments, one or more of the illustrative components may be incorporated in, or otherwise form a portion of, another component.

The compute engine 202 may be embodied as any type of device or collection of devices capable of performing various compute functions described below. In some embodiments, the compute engine 202 may be embodied as a single device such as an integrated circuit, an embedded system, a field programmable gate array (FPGA), a system-on-a-chip (SOC), or other integrated system or device. Additionally, in some embodiments, the compute engine 202 includes or is embodied as a processor 204 and a memory 210. The processor 204 may be embodied as one or more processors, each processor being a type capable of performing the functions described herein. For example, the processor 204 may be embodied as a single or multi-core processor(s), a microcontroller, or other processor or processing/controlling circuit. In some embodiments, the processor 204 may be embodied as, include, or be coupled to an FPGA, an ASIC, reconfigurable hardware or hardware circuitry, or other specialized hardware to facilitate performance of the functions described herein.

The illustrative processor 204 includes a control logic unit 206 and a platform logic unit 208. The control logic unit 206 may be embodied as any type of hardware (e.g., a co-processor, an integrated circuit, etc.) or software used to determine and carry out courses of action for an underlying autonomous vehicle 102 (e.g., on which the on-board vehicle control system 104 is configured), e.g., as part of a platoon formed in response to detecting an emergency situation. The control logic unit 206 may communicate with one or more of the sensors 220 via the I/O subsystem 212 to retrieve data regarding operation of the underlying autonomous vehicle 102. Further, the platform logic unit 208 may be embodied as any type of hardware (e.g., a co-processor, an integrated circuit, etc.) or software that provides autonomous functions for the autonomous vehicle 102, such as artificial intelligence (AI) and machine learning (ML) logic, to observe and learn driving situations in real-time and decide on actions as a result of the observed situations. The platform logic unit 208 may be in communication with the control logic unit 206 to trigger alerts and control a driving behavior of the autonomous vehicle 102.

The memory 210 may be embodied as any type of volatile (e.g., dynamic random access memory, etc.) or non-volatile memory (e.g., byte addressable memory) or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 210 may be integrated into the processor 204.

The compute engine 202 is communicatively coupled with other components of the on-board vehicle control system 104 via the I/O subsystem 212, which may be embodied as circuitry and/or components to facilitate input/output operations with the compute engine 202 (e.g., with the processor 204 and/or the memory 210) and other components of the on-board vehicle control system 104. For example, the I/O subsystem 212 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 212 may form a portion of a system-on-a-chip (SoC) and be incorporated, along with one or more of the processor 204, the memory 210, and other components of the on-board vehicle control system 104, into the compute engine 202.

The one or more illustrative data storage devices 214 may be embodied as any type of devices configured for short-term or long-term storage of data such as, for example, memory devices and circuits, memory cards, hard disk drives (HDDs), solid-state drives (SSDs), or other data storage devices. Each data storage device 214 may include a system partition that stores data and firmware code for the data storage device 214. Each data storage device 214 may also include an operating system partition that stores data files and executables for an operating system.

The communication circuitry 216 may be embodied as any communication circuit, device, or collection thereof, capable of enabling communications over a network between the on-board vehicle control system 104 and other devices (e.g., on-board vehicle control systems 104 in other autonomous vehicles 102). The communication circuitry 216 may be configured to use any one or more communication technology (e.g., wired, wireless, and/or cellular communications) and associated protocols (e.g., Ethernet, Bluetooth®, Wi-Fi®, WiMAX, 5G-based protocols, etc.) to effect such communication.

The illustrative communication circuitry 216 includes a network interface controller (NIC) 218, which may also be referred to as a host fabric interface (HFI). The NIC 218 may be embodied as one or more add-in-boards, daughtercards, controller chips, chipsets, or other devices that may be used by the on-board vehicle control system 104 for network communications with remote devices. For example, the NIC 218 may be embodied as an expansion card coupled to the I/O subsystem 212 over an expansion bus, such as PCI Express.

The one or more illustrative sensors 220 may be embodied as any type of device, or collection of devices, that is configured to collect data relating to the surroundings or interior of the associated autonomous vehicle 102 so that logic in the on-board vehicle control system 104 (e.g., the control logic unit 206) may carry out actions responsive to the data (e.g., whether to accelerate the autonomous vehicle 102 or come to a stop). For example, the sensors 220 can include a global positioning system (GPS), cameras, radar, lasers, speedometers, angular rate sensors, computer vision sensors, and so on. The sensors 220 may communicate data to the control logic unit 206 (or any other component within the on-board vehicle control system 104) via the I/O subsystem 212.

Additionally or alternatively, the on-board vehicle control system 104 may include one or more peripheral devices. Such peripheral devices may include any type of peripheral device commonly found in a compute device such as a display, speakers, a mouse, a keyboard, and/or other input/output devices, interface devices, and/or other peripheral devices.

While not illustratively shown, the on-board vehicle control system 104 may be in communication with one or more other networks (e.g., via the NIC 218 to an edge network device), which may be embodied as any type of wireless communication network, including, but not limited to, a wireless local area network (WLAN) (e.g., DSRC based on the Institute of Electrical and Electronics Engineers (IEEE) 802.11 specification), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a wide area network (WAN), a global network (e.g., the Internet), or any combination thereof.

Figure 3:
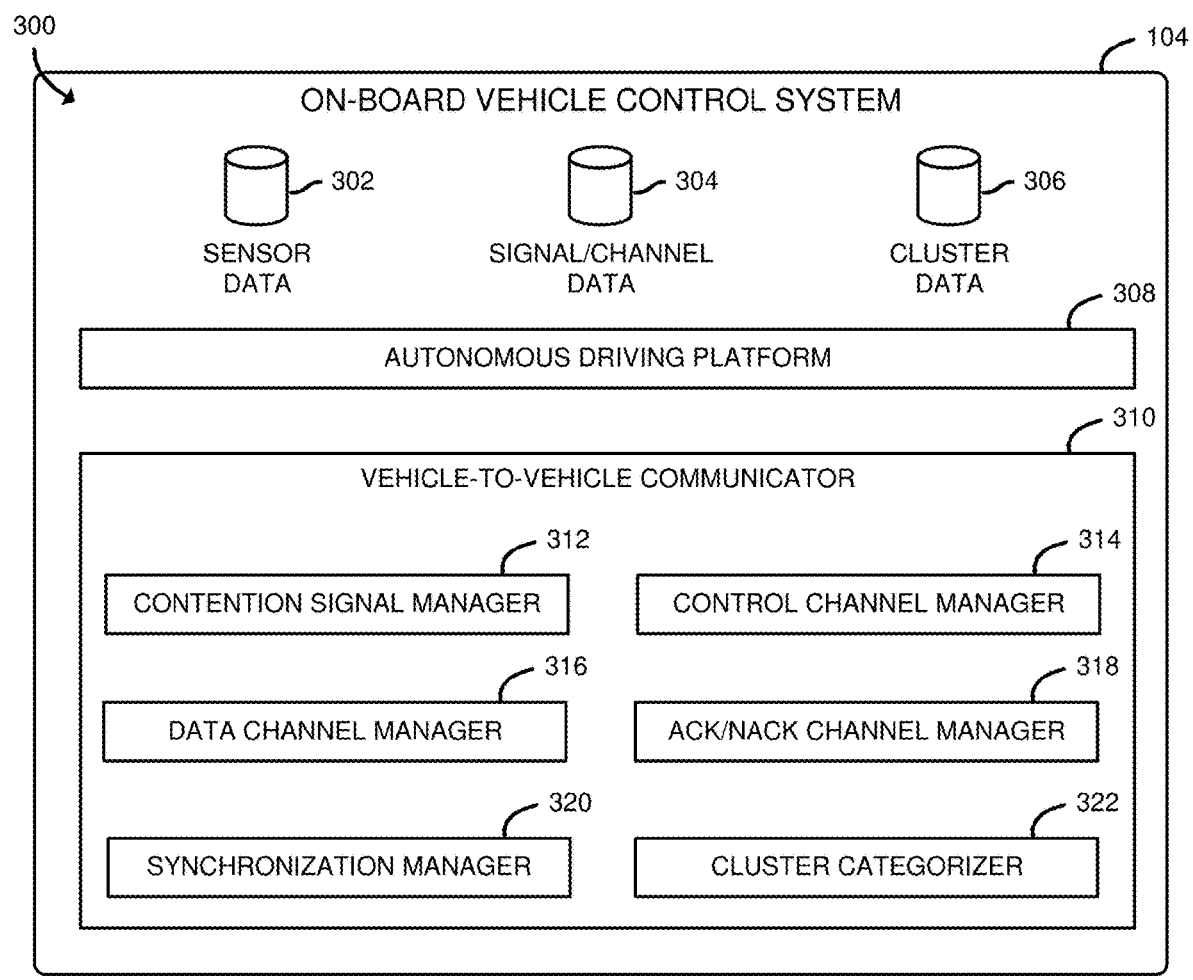
FIG. 3 is a simplified block diagram of at least one embodiment of an environment that may be established by the vehicle control system of FIGS. 1 and 2.

Referring now to FIG. 3, in use, an on-board vehicle control system 104 establishes an illustrative environment 300 during operation. The illustrative environment 300 includes an autonomous driving platform 308 and a V2V communicator 310. Each of the various components of the environment 300 may be embodied as hardware, firmware, software, or a combination thereof. As such, in some embodiments, one or more of the components of the environment 300 may be embodied as circuitry or collection of electrical devices (e.g., autonomous driving platform circuitry 308, V2V communication circuitry 310, etc.). It should be appreciated that one or more functions described herein as being performed by the autonomous driving platform circuitry 308 and/or the V2V communication circuitry 310 may be performed, at least in part, by one or more other components of the on-board vehicle control system 104, such as the compute engine 202, the I/O subsystem 212, the communication circuitry 216 (e.g., via the NIC 218), an ASIC, a programmable circuit such as an FPGA, and/or other components of the on-board vehicle control system 104. It should be further appreciated that associated instructions may be stored in the memory 210, the data storage device(s) 214, and/or another data storage location, which may be executed by processor 204 of the compute engine 202 and/or other computational processor of the on-board vehicle control system 104.

Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by one or more of the compute engine 202, the communication circuitry 216, and/or other software/hardware components of the on-board vehicle control system 104. It should be appreciated that the environment 300 of the on-board vehicle control system 104 may include other components, sub-components, modules, sub-modules, logic, sub-logic, and/or devices commonly found in a computing device (e.g., device drivers, interfaces, etc.), which are not illustrated in FIG. 3 for clarity of the description.

In the illustrative embodiment, the environment 300 includes sensor data 302, which may be embodied as any data captured by one or more sensors (e.g., one or more of the sensors 220 of FIG. 2) in the on-board vehicle control system 104 or the underlying autonomous vehicle 102, generally. For example, the sensor data 302 may include geolocation data, visible road geometry data, image sensor data, speedometer data, data from laser and/or radar sensors, and the like. Additionally, the environment 300 also includes signal/channel data 304, which may be embodied as any data representative of information relating to the data channels and the control channels, respectively, as described herein. Further, the illustrative environment includes cluster data 306, which may include any data usable to identify the cluster (e.g., the cluster 108 of FIG. 1) in which the autonomous vehicle 102 corresponds, as well as a present role of the autonomous vehicle 102 within a cluster relative to the roles of other autonomous vehicles (e.g., in that cluster or an adjacent/overlapping cluster within range of that cluster). It should be appreciated that, depending on the embodiment, the cluster data 306 may additionally include any corresponding infrastructure within the range of that cluster to which the autonomous vehicle 102 is capable of communicating with.

The autonomous driving platform 308, which may be embodied as hardware, firmware, software, virtualized hardware, emulated architecture, and/or a combination thereof as discussed above, is configured to observe and learn driving situations, e.g., using a variety of AI and machine learning techniques. For example, the autonomous driving platform 308 is configured to distinguish expected driving behavior based on observed conditions while the autonomous vehicle 102 is in operation. Doing so allows the autonomous driving platform 308 to pursue a given course of action (e.g., direction, speed, etc.) based on present conditions and relative to other, nearby autonomous vehicles 102. Accordingly, the autonomous driving platform 308 may include decision-making logic for directing the autonomous vehicle 102 to carry out a course of action agreed-upon by a given amount of vehicles (e.g., a quorum of the vehicles) in the cluster. For example, the autonomous driving platform 308 may communicate with vehicle hardware to, for example, control acceleration, braking, steering, and the like, of the autonomous vehicle 102.

The V2V communicator 310, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from other autonomous vehicles 102 within the cluster, as well as any corresponding infrastructure capable of supporting such communications. In other words, the V2V communicator 310 is configured to packetize and send raw or processed data (e.g., sensor data) to other autonomous vehicles 102, as well as receive packetized data and process data from the received packets as described herein. Accordingly, in some embodiments, at least a portion of the functionality of the V2V communicator 310 may be performed by the communication circuitry 216, and, in the illustrative embodiment, by communication circuitry 216, or more particularly the NIC 218.

The illustrative V2V communicator 310 includes a contention channel manager 312, a control channel manager 314, a data channel manager 316, an ACK/NACK channel manager 318, a synchronization manager 320, and a message categorizer 322, each of which may be embodied as hardware, firmware, software, virtualized hardware, emulated architecture, circuitry, and/or a combination thereof as discussed above. The contention channel manager 312 is configured to manage the contention channel for contention-based self-contained access. In other words, the contention channel manager 312 is configured to employ a contention based access strategy within a self-contained sub-frame (see, e.g., the illustrative sub-frame 400 of FIG. 4) that enables intra-cluster resource reservations. The frame structure includes contention, centralized contention resolution, data transmission, and HARQ feedback within one sub-frame duration.

In an illustrative embodiment, the contention channel manager 312 may be configured to use orthogonal frequency-division multiple access (OFDMA) for multiple access in the proposed framework, while in other embodiments the contention channel manager 312 may be configured to employ alternative digital modulation schemes, such as single-carrier FDMA (SCFDMA), code division multiple access (CDMA), and discrete Fourier transform-spread-FDMA (DFT-s-FDMA), for example. The contention channel manager 312 is configured to divide the available system bandwidth into sub-bands. It should be understood that each sub-band consists of several physical resource blocks (PRBs), with each PRB containing for example, "N" sub-carriers and "M" OFDM symbols, and that each PRB contains "N·M" resource elements (RE), wherein "N" and "M" are positive integers.

To manage the contention channel, when an autonomous vehicle 102 intends to reserve the channel for transmission, the contention channel manager 312 transmits a contention signal in the contention channel. As illustratively shown in FIG. 4, the illustrative contention channel 402 in the sub-frame structure 400 consists of two contention slots, each containing OFDM symbols (e.g., 60 kHz sub-carrier spacing (SCS)). Each illustrative contention slot consists of "A" PRBs in the frequency domain 410 and "B" OFDM symbols in time domain 412, wherein "A" and "B" are positive integers. It should be appreciated that the number of contention slots can be provisioned by the contention channel manager 312 based on the expected network load. It should be further appreciated that each contention slot does not need to align with the sub-channel size in the frequency domain.

Referring back to FIG. 3, in use, when the autonomous vehicle 102 has some data to transmit, the contention channel manager 312 randomly selects an orthogonal sequence from a known pool. Additionally, the contention channel manager 312 is configured to create some amount of bits of payload that are usable to indicate a type of data the autonomous vehicle 102 wants to transmit (e.g., mission critical, periodic measurement, on-demand, etc.), requesting unicast or broadcast transmission, a buffer status (e.g., an amount of data available), etc. The contention channel manager 312 is configured to spread the payload using the orthogonal sequence and scramble using a temporary identifier associated with either the cluster or cluster head.

The contention channel manager 312 is further configured to transmit the signal in a contention slot. It should be appreciated that multiple autonomous vehicles 102 may contend in the contention slot and a designate cluster head or centralized entity would be able to resolve the contention due to orthogonal spreading. In some embodiments, the contention channel manager 312 is configured to introduce an optional gap between the two OFDM symbols of the contention channel 402. It should be appreciated that such a gap may be necessary for the self-admission control for low priority devices to switch between a receiving mode and a transmission mode. In an illustrative example in which the first and second contention slots are first and second OFDM symbols of the contention channel 402, respectively, the devices with low priority data would monitor the energy (i.e., energy detection) in the first contention slot and if the channel is empty, the devices would contend in the second contention slot in the sub-frame 400. Otherwise, the devices would wait for a few sub-frames and monitor the contention channel 402 for resource reservation before contending for resources. Additionally, the devices with low priority can also detect the presence of high priority messages and refrain from transmitting their contention request. The selection of the contention slot, contention subchannel, and the spreading sequences can be converted into a unique identifier. This identifier can be used by the control channel manager 314 when assigning the resources to the contending autonomous vehicle.

The control channel manager 314 is configured to manage the control channel for facilitating the V2V communications. Referring again to FIG. 4, an illustrative control channel 404 in the frame structure 400 includes two OFDM symbols (e.g., 15 kHz SCS). Referring back to FIG. 3, the control channel manager 314 is configured to manage the control channel by successfully decoding contention signals in the contention channel 402 when received from multiple autonomous vehicles 102. It should be appreciated that such management may only be performed by the control channel manager of a central decision-making entity (e.g., the cluster head 106 of FIG. 1). In other words, the control channel manager 314 of the autonomous vehicle 102 designated as the cluster head 106 is configured to decode the contention signals, such as may be based on a type and/or priority of the request, as well as make the scheduling decisions related to the applicable radio resources.

The scheduling decision may then be transmitted to the other autonomous vehicles 102 in the cluster 108 (e.g., in a broadcast manner) in the downlink (DL) control channel. Depending on the embodiments, the DL control channel may carry scheduling information includes information usable to identify the vehicle, resources, and/or transmission related information. Such scheduling information may include a vehicle identifier, allocated resource start and end indices, DL or uplink (UL) designation, broadcast or unicast transmission, modulation and/or coding scheme for the transmission, priority, a designation as a first transmission or retransmission, etc. Under certain conditions, the scheduling information of a unicast transmission for a particular autonomous vehicle 102 may be scrambled using its vehicle identifier, which may be a temporary identifier, for security purposes. Additionally or alternatively, broadcast transmissions may be scrambled using a broadcast group identifier.

The data channel manager 316 is configured to manage the data channel of the V2V communications. Again referring to the illustrative frame structure 400 of FIG. 4, a data channel 406 is illustratively shown as being comprised of ten OFDM symbols (e.g., 15 kHz SCS). It should be appreciated that, for an UL or broadcast transmission, when an autonomous vehicle 102 successfully decodes the DL control information, a data packet is created for transmission. Referring back to FIG. 3, the data channel manager 316 is additionally configured to select a modulation coding level (MCS) and a transport block size (e.g., based on received control information). For example, if the data packet is a retransmission packet, the data channel manager 316 is configured to create the packet based on the HARQ scheme employed. In another example, if the data packet is a DL packet, the cluster head 106, or central entity of the cluster 108, could create packets for the other autonomous vehicles 102, such as may be based on information received via the UL control channel and/or measured at the cluster head 106 based on one or more pilot signals. Additionally, the cluster head 106 may broadcast some packets if necessary.

Figure 4:
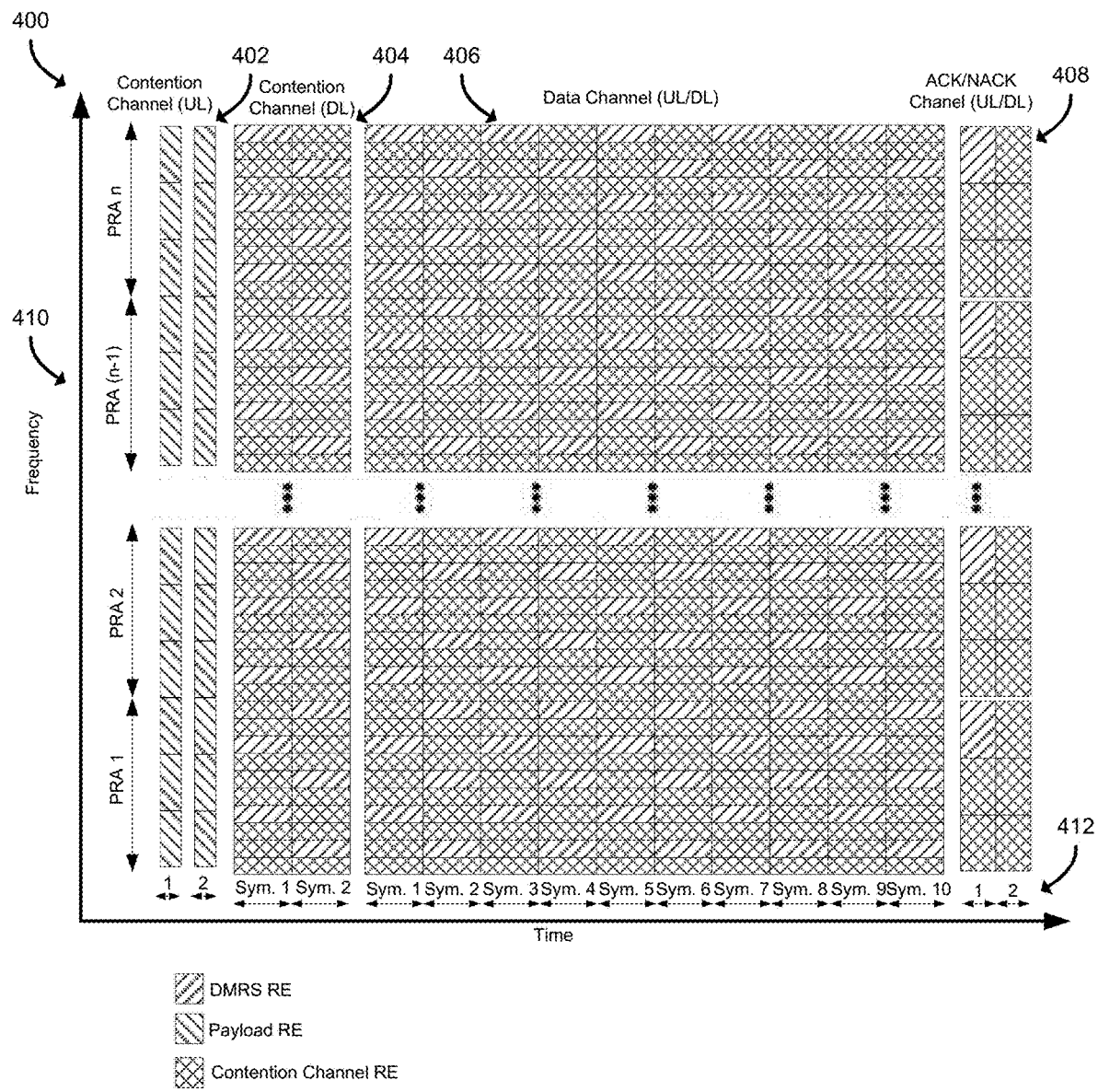
FIG. 4 is an illustrative representation of at least one embodiment of a self-contained sub-frame structure that enables the autonomous vehicles of the cluster of FIG. 1 to communicate with a low end-to-end latency.

The ACK/NACK channel manager 318 is configured to manage the ACK/NACK channels for facilitating V2V communications. As shown in FIG. 4, the illustrative ACK/NACK channel 408 in the frame structure 400 consists of two OFDM symbols (e.g., 60 kHz SCS). As illustratively shown, the sub-band granularity of the ACK/NACK channel 408 exactly matches with the sub-band granularity of the data channel 406. The ACK/NACK channel manager 318 is configured to manage the information carried in the ACK/NACK channel 408, which can include an acknowledgement for correct packet reception, a channel quality indicator for the next transmission opportunity, etc. The ACK/NACK channel manager 318 can be additionally configured to not transmit information in the ACK/NACK channel (i.e., the data is left as a gap), if the current resource allocation in a sub-frame is for broadcast.

Figure 5:
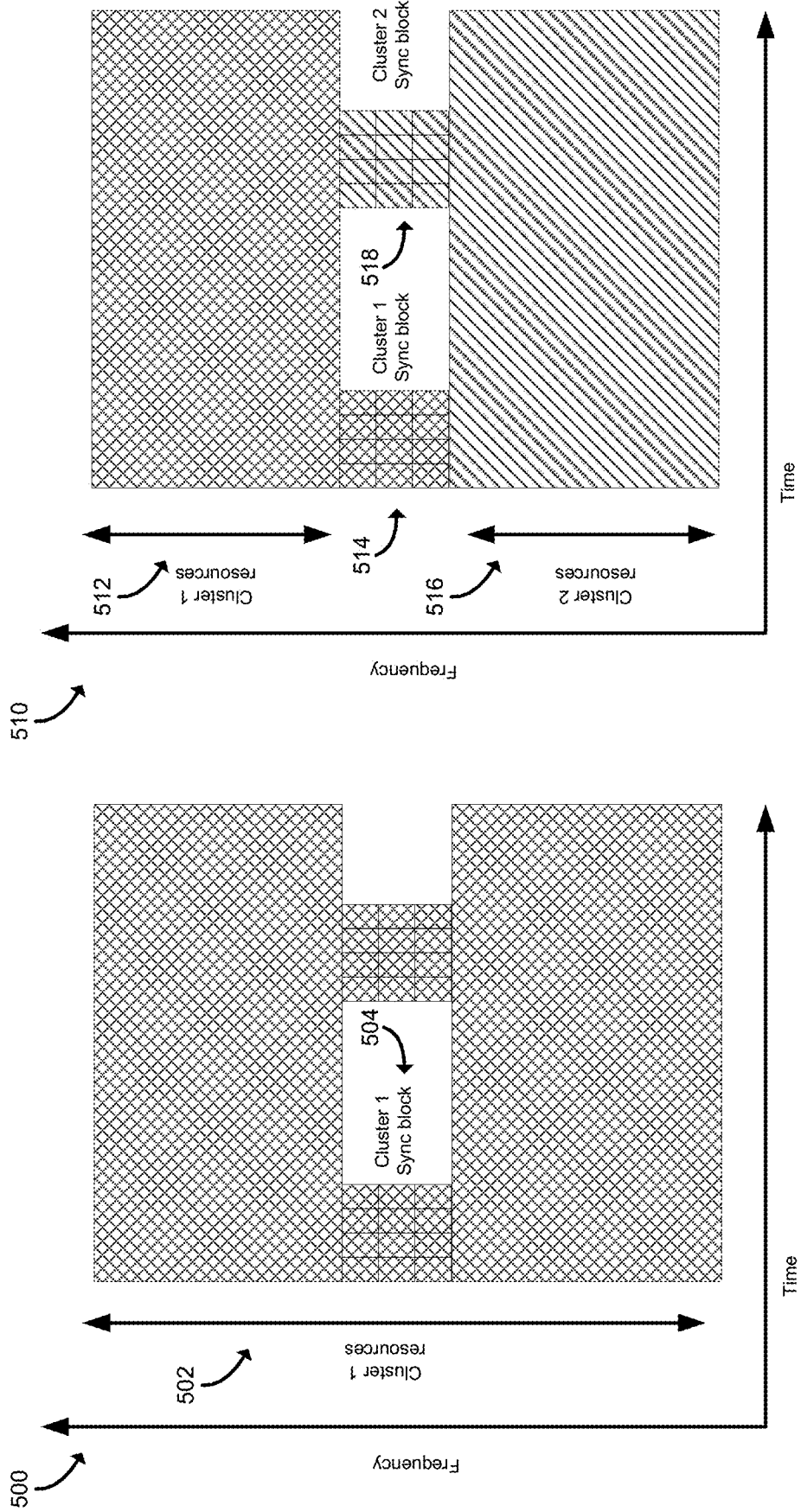
FIGS. 5A and 5B are simplified block diagrams of at least one embodiment of a frame structure illustrating cluster coexistence when performing V2V communications between autonomous vehicles in the communication range of one or more clusters.

The synchronization manager 320 is configured to manage the synchronization and discovery of the autonomous vehicles 102 within a cluster 108. It should be appreciated that the synchronization manager 320 of all of the autonomous vehicles 102 are capable of transmitting a synchronization signal and/or a discovery signal. Referring now to FIGS. 5A and 5B, synchronous blocks of one or more clusters when performing V2V communications between autonomous vehicles in the cluster(s) are shown. As illustratively shown in FIG. 5A, a sync block 504 of a first cluster of resources 502 are shown. As illustratively shown in FIG. 5b, a sync block 514 of a first cluster of resources 512 is shown, as well as a sync block 518 of a second cluster of resources 516 is shown.

Referring back to FIG. 3, the synchronization manager 320 is configured to transmit the synchronization signals and/or discovery signals in a reserved number of PRBs (e.g., the middle 12 PRBs as illustratively shown in FIG. 5A) of the system bandwidth. The synchronization manager 320 is configured to construct the synchronization block to include a primary sync signal, a secondary sync signal, and a primary broadcast control signal. Additionally, the synchronization manager 320 of a cluster head or central entity is configured to transmit the sync block periodically. Depending on the embodiment, the periodicity of the sync block may be configurable.

It should be appreciated that, if there is another cluster in the vicinity that operates in the same frequency band, the cluster head of that other cluster may be configured to transmit its sync block in the same sync channel (e.g., the middle 12 PRBs as illustratively shown in FIG. 5B) without colliding with the sync block of the other cluster. To do so, the synchronization manager 320 of the cluster head may be configured to ensure when the other cluster's sync block is transmitted, the synchronization manager 320 of the cluster head would be in a listening mode. Accordingly, the synchronization manager 320 of cluster heads in different clusters can scan the sync channel in every sub-frame to check whether any other clusters are present. It should be appreciated that the inter-cluster coordination messages can be transmitted within the sync channel, and that such messages can be transmitted with a higher link margin to reach the other cluster head. These messages can also be transmitted in the control channel, with the receiving clusterhead electing to be silent in the control channel duration.

The cluster categorizer 322 is configured to categorize the clusters into levels of clustering functions, such as may be based on a type of cooperation between autonomous vehicles 102. In an illustrative example, the cluster categorizer 322 may be configured to categorize the clustering into three levels, such as low, medium, and high. In furtherance of the illustrative example, the low level of clustering may include basic safety messages (BSMs), a location, an acceleration value, a speed value, and an intention, each of which can be shared among the autonomous vehicles 102 in the associated cluster. In low level clustering, a driver may sit behind the steering wheel of the autonomous vehicle 102 and take over the controls when necessary.

Additionally, in the medium level clustering, a driver may sit behind a steering wheel of an autonomous vehicle 102 acting as the cluster head with one fully autonomous vehicle in the cluster. As such, if necessary, the driver behind the steering wheel can assume control of the vehicles or assist with some driving decision-making. In addition to the BSM, location, acceleration, speed, and intention, the autonomous vehicles 102 may share sensor data with other autonomous vehicles within the cluster. Further, in the high level of clustering, all the autonomous vehicles 102 of the cluster are fully autonomous vehicles. As such, all the sensor information should be shared among the members for the collaborative cluster driving. In such embodiments, a human driver may remotely take control of the cluster or cluster members.

Figure 6:
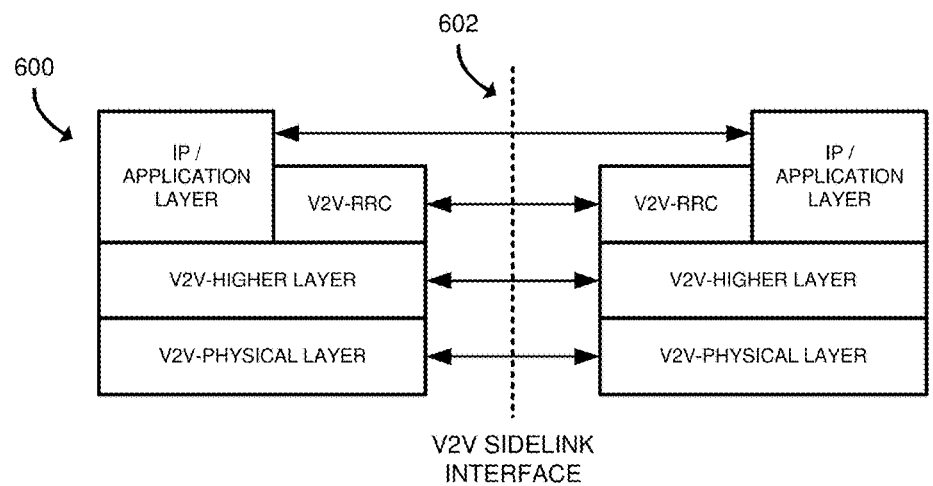
FIG. 6 is a simplified block diagram of at least one embodiment of a protocol stack established by the vehicle control system of FIGS. 1 and 2.

Referring now to FIG. 6, an illustrative protocol stack 600 of the V2V communication system is shown, which can be established by an on-board vehicle control system (e.g., the on-board vehicle control system 104 of FIG. 1) of an autonomous vehicle 102. As previously described, the self-contained sub-frame 400 of FIG. 4 can enable a V2V communication system to realize low (e.g., generally 1 ms) V2V-PHY to V2V-PHY layer latency. Additionally, for improving end-to-end latency, simplified Layer 2 protocols may also be employed.

As shown in the illustrative protocol stack 600 of FIG. 6, the simplified protocol layers include a physical layer (e.g., V2V-Physical Layer), a higher layer (e.g., V2V-Higher Layer), a radio resource control layer (e.g., V2V-RRC) at the control plane, and an IP/Application Layer. In the V2V-Higher Layer (e.g., layer 2) several functions may be supported, such as HARQ support for the V2V-Physical Layer, scheduling (e.g., by a cluster head), MAC protocol data unit (PDU) data packet processing for the V2V-Physical Layer, segmentation and assembly, ARQ, authentication and reordering, for example. Additionally, the V2V-RRC layer is responsible for the control plane signaling.

In some embodiments, the HARQ may be supported for unicast data channels. Additionally or alternatively, chase combining and incremental redundancy (IR) schemes may be supported. Depending on the HARQ scheme, a scheduler could process a data packet for transmission. If the data packets coming from the IP/Application Layer are larger (e.g., than a size of a MACPDU), the V2V-Higher Layer could segment the data packets to fit in the MACPDUs. Under such conditions, a sequence number could be added in the process. On the receiving end, the V2V-Higher Layer could receive the data packets and reassemble based on the sequence number. Additionally, if one or more of the data packets were not correctly received in the unicast mode, the ARQ process could be initiated to retransmit the data packet that was not correctly received.

In an illustrative example in which a data packet is to be transmitted in broadcast mode, if the data packet is not correctly received by a cluster member 'A' broadcasted by another cluster member 'B' who is in the broadcast neighbor set of cluster member 'A', then cluster member 'A' can send an indication to the cluster head 106 that indicates the broadcast packet from cluster member 'B' with sequence number 'N' (e.g., wherein 'N' is a positive integer) is not correctly received via the UL control channel. Accordingly, the cluster head could forward that packet to cluster member 'A' via a unicast transmission. In other words, the cluster head 106 is configured to assist every cluster member within the cluster to maintain a critical message broadcast neighbor list based on their location, speed, intention, etc. For example, if a cluster member 'M' is in the neighbor list of the cluster member 'N', cluster member 'N' is within the transmission range cluster member 'M'. The V2V-Higher Layer receives the data packets from the lower V2V-Physical Layer and orders the data packets before sending them to the IP/Application Layer.

It should be appreciated that, in the cluster head-based design, all the autonomous vehicles 102 have the capability to function as a cluster head 106. For example, when autonomous vehicle 'A' is about to connect to a network, autonomous vehicle 'A' listens the sync channel of the frequency band for a period of time to see whether there are any other clusters present. If autonomous vehicle 'A' does not find any other clusters present, then autonomous vehicle 'A' starts to transmit the periodic sync signal or discovery signal, and continues to monitor the sync channel and contention slots. When another autonomous vehicle B' comes in the vicinity of autonomous vehicle 'A', autonomous vehicle 'B' listens to the sync channel of autonomous vehicle 'A', starts to send the contention signal to autonomous vehicle 'A', and connects with the autonomous vehicle 'A'. If both autonomous vehicle 'A' and autonomous vehicle 'B' started the transmission of sync signals when they discover each other, they can negotiate via the inter cluster communication message in the sync or control channels, and one of them could then take the role as cluster head 106 of the applicable cluster.

It should be appreciated that multiple autonomous vehicles 102 may send their contention signals in the same contention slot. As the contention signals are frequency domain spread orthogonal sequences, the cluster head 106 is configure to be able to detect and identify them (e.g., based on the priority, request for resource type, and transmission mode, the cluster head 106 may allocate the subchannels, modulation and coding scheme (MCS), and power level for each autonomous vehicle 102). Initially, a lowest possible MCS level could be assigned for the unicast transmission mode by the cluster head 106. Subsequently, the receiving autonomous vehicle 102 could do channel estimation and report back a channel quality indicator (CQI) or MCS level in the ACK/NACK channel.

By following a scheduling opportunity, the cluster head 106 could use the reported MCS level. If the time gap is greater than the coherence time of the channel, the reported MCS may not be used. It should be appreciated that the process may subsequently restart from the lowest MCS. In another illustrative example, for broadcast transmissions, few fixed MCS levels would likely be used and the control channel may carry the MCS information. For the unicast mode, if a data packet is correctly decoded, an acknowledgment (ACK) could be transmitted in the ACK/NACK channel. Alternatively, if a negative acknowledgment (NACK) is received by the cluster head 106, the HARQ retransmission can be initiated.

It should be appreciated that different types of network traffic may be transmitted across vehicular networks. In an illustrative embodiment, three different types of network traffic are expected on the vehicular networks: critical event driven broadcast or unicast, on-demand, and periodic measurements. Accordingly, it should be further appreciated that, in such embodiments, autonomous vehicles 102 with critical event driven broadcast or unicast network traffic will likely always need to contend for resources; whereas the on-demand and periodic measurement traffic types will likely only contend at a first access and request semi-persistent allocation for such network traffic. Depending on the nature of the request, the cluster head 106 may be configured to decide the frequency (e.g., once in every 100 ms) and bandwidth (e.g., number of sub channels).

More often than not, when a cluster is moving, one or more cluster members and/or the cluster head 106 may leave the cluster. If a cluster member leaves the cluster, it should first announce the intent to leave the cluster to the cluster head 106. To do so, the cluster head 106 should stop scheduling resources to the leaving cluster member (e.g., when the leaving cluster member is out of range, after an agreed period of time, etc.). Additionally, if an autonomous vehicle 102 leaves a cluster and wants to join an adjacent cluster, the autonomous vehicle 102 should signal the intention to the cluster head of the present cluster. Accordingly, the cluster head of the present cluster could request the measurement of the signal strength of the adjacent cluster from the autonomous vehicle 102 intending to join the adjacent cluster.

Further, the cluster head could negotiate the transition with a cluster head of the adjacent cluster via the inter-cluster communications in the sync or control channels. As such, once the cluster head of the present cluster and the cluster head of the adjacent cluster agree, the cluster head of the present cluster could transfer the context of the autonomous vehicle 102 intending to join the adjacent cluster to the cluster head of the adjacent cluster. The autonomous vehicle 102 can then send a contention signal to the cluster head of the adjacent cluster and get connected to the adjacent cluster. If a cluster head decides to leave the cluster, the cluster head should be configured to start preparing a cluster member of the cluster to take over the role of the cluster head. Accordingly, once the cluster member that is designated to assume the role of cluster head receives all of the context information about the other cluster members and inter-cluster coordination information, the new cluster head could start to transmit the periodic sync signal in the sync channel, coordinate with other clusters, start monitoring the contention channel, and assign resources of the cluster among the remaining autonomous vehicles 102 of the cluster.

Figure 7:
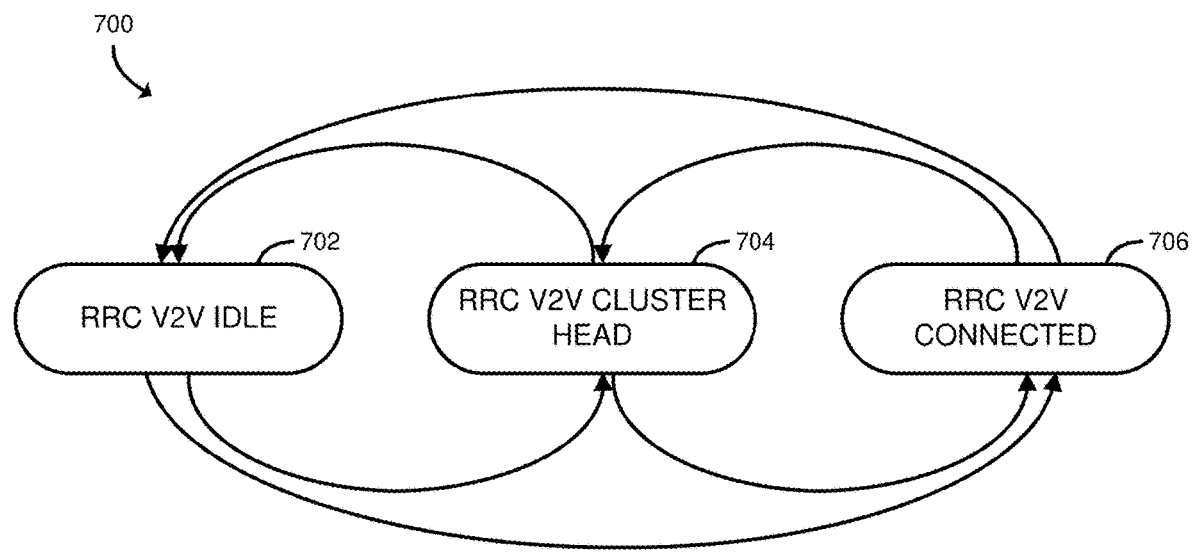
FIG. 7 is a simplified state diagram of at least one embodiment of radio resource control (RRC) protocol states of an autonomous vehicle in a cluster during V2V communications.

As illustratively shown in FIG. 7, there are three RRC states: RRC V2V idle 702, RRC V2V cluster head 704, and RRC V2V connected 706. When an autonomous vehicle 102 is started and ready to connect with any other autonomous vehicle 102, the communication state is in the RRC V2V idle 702 state. If the autonomous vehicle 102 enters a cluster and becomes a member of the cluster, the autonomous vehicle 102 is in the RRC V2V connected 706 state. Additionally, if the autonomous vehicle 102 becomes a cluster head, the autonomous vehicle 102 enters into the RRC V2V cluster head 704 state.

Figure 8:
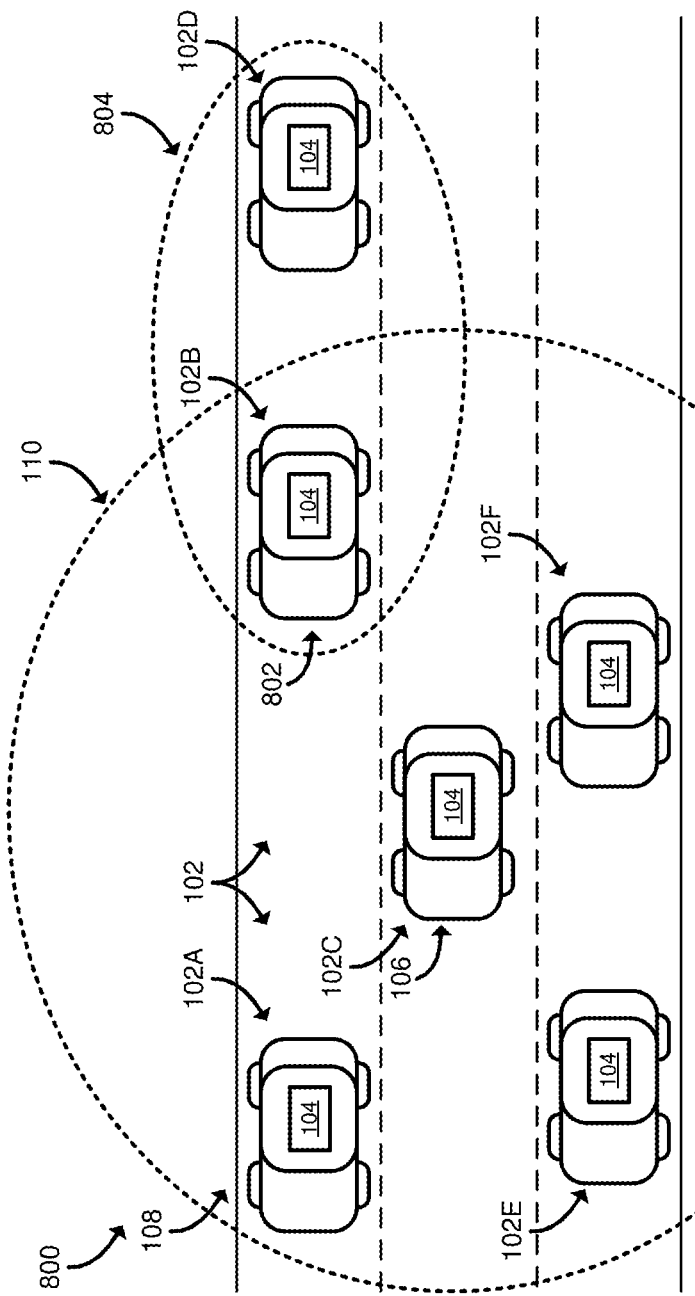
FIG. 8 is a simplified conceptual diagram of at least one other embodiment of another system in which a plurality of autonomous vehicles forms a cluster to facilitate V2V communications in which at least one vehicle is out-of-range of a communication range of the cluster.

Referring now to FIG. 8, similar to FIG. 1, a system 800 is shown that includes the plurality of autonomous vehicles 102 of FIG. 1 forming a cluster 108 to facilitate V2V communications. However, unlike the system 100 of FIG. 1, the autonomous vehicle 102D of the system 800 is now outside of the broadcast coverage boundary 110 of the cluster 108. It should be appreciated that in some splitting/merging freeway scenarios, the cluster 108 may split into two independent clusters or two independent clusters may merge and become a single cluster. In the splitting scenario (i.e., wherein one cluster becomes two independent clusters), the cluster head 106 can periodically get the intention or route plan of the other autonomous vehicles 102 of the cluster 108 and may recognize that one or more of the other autonomous vehicles 102 is going to move outside of the broadcast coverage boundary 110 out of the cluster 108 established by the cluster head 106.

Accordingly, the cluster head 106 can assist the one or more of the other autonomous vehicles 102 to establish a new cluster head 106 for the other cluster, signal the info (e.g., a time frame for listening for a new sync signal, sending a contention signal, etc.) to other splitting autonomous vehicles 102 and pass the context of the splitting autonomous vehicles 102 of the new cluster to be formed to the new established cluster head. Upon being established, the new cluster head could start transmitting its sync signal in a particular sub-frame, as directed by the old cluster head 106 and start listening for a contention signal from the other split autonomous vehicles 102 of the new cluster. It should be appreciated that, after splitting has completed, the original cluster 108 may change the cluster head 106 (i.e., designate one of the remaining autonomous vehicles 102 of the original cluster 108 as the cluster head 106 of the original cluster 108), if necessary.

In the merging scenario, as soon as the cluster heads listen to each other via the inter-cluster communication messages and recognize the intention to merge the two respective clusters, the cluster heads are configured to start preparing the other autonomous vehicles 102 of the respective clusters for the merge to a new, singular cluster. Accordingly, a new cluster head is identified between all the autonomous vehicles 102 of the new cluster and the context of all of the autonomous vehicles 102 in the new cluster are passed to it. In some scenarios, such as the system 800 of FIG. 8, in which such a scenario is illustrated wherein a cluster head 106 may not have enough coverage to form an efficient cluster.

In such situations, only a part of the cluster 108 may be able to receive the sync signal of the out-of-range autonomous vehicle 102, illustratively shown as autonomous vehicle 102D. Accordingly, another autonomous vehicle 102 in the cluster 108 and within the broadcast range 804 can act as a relay vehicle 802, illustratively shown as autonomous vehicle 102B. Under such conditions, the relay vehicle 802 may report the existence of the out-of-range vehicle to the cluster head 106 with the applicable measurements. In some embodiments in which more than one autonomous vehicle 102 is within range of the out-of-range vehicle, the cluster head 106 may be configured to pick one of those autonomous vehicles to act as the relay vehicle 802 for the out-of-range vehicle.

Under such conditions, the relay vehicle 802 could start transmitting a relay sync signal in the sync channel. It should be appreciated that the relay vehicle 802 is responsible for forwarding the information from the cluster head 106 to the out-of-range vehicle and from the out-of-range vehicle to the cluster head 106. For example, if the out-of-range vehicle broadcasts a critical message, the relay vehicle 802 is configured to receive the critical message and broadcast the critical message to the other autonomous vehicles in the cluster 108. Depending on the embodiment, the cluster head 106 may be configured to limit the number of hops to reduce the end-to-end latency.

Figure 9:
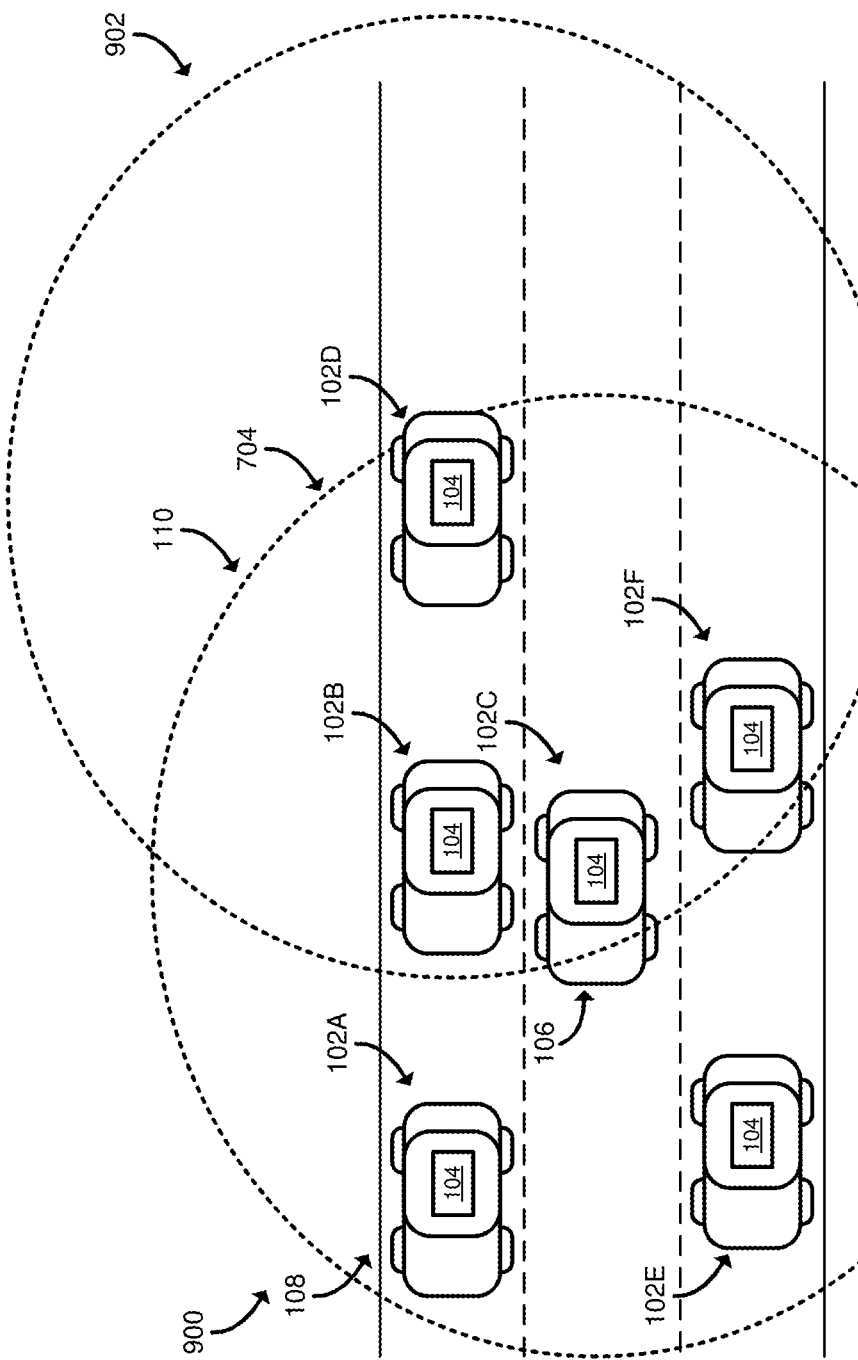
FIG. 9 is a simplified conceptual diagram of at least one other embodiment of another system in which a plurality of autonomous vehicles forms a cluster to facilitate V2V communications in which at least one vehicle is out-of-range of a communication range of the cluster.

Under certain conditions, an autonomous vehicle 102 on the edge of a cluster 108 may request a radio resource for broadcasting and broadcast a critical safety message. Referring now to the illustrative system 900 of FIG. 9, while the autonomous vehicle 102D is within the broadcast coverage boundary 110 of the cluster 108 (e.g., relative to the cluster head 106 illustratively shown as autonomous vehicle 102C), the broadcast coverage 902 of the autonomous vehicle 102D is not able to reach all of the autonomous vehicles 102 of the cluster 108 (e.g., illustratively shown as autonomous vehicles 102A and 102E in FIG. 8). Under such conditions, the cluster head 106 may be configured to broadcast or groupcast messages to those autonomous vehicles 102A and 102E who potentially did not receive an initial broadcast from the autonomous vehicle 102D.

For example, in a moving cluster scenario, if synchronization of one autonomous vehicle 102 in the cluster 108 is lost or the cluster head 106 did not receive the periodic measurement messages for more than a specified period of time, the cluster head 106 may remove the autonomous vehicle 102 from a cluster member list and reallocate resources to one or more other autonomous vehicles 102 remaining in the cluster 108. It should be appreciated that, under such conditions wherein the autonomous vehicle 102 loses the synchronization with the cluster head 106, that autonomous vehicle 102 may be configured to start a network entry process again, such as by scanning the sync channel and transmitting a contention signal.

Additionally, under certain conditions, clustering may be performed pre-emptively, which may be based on information gathered from higher layers, such as speed, direction, geolocation, expected travel route, etc., of the clusters. In this case, the cluster formation/splitting/merging can be decided based on the expected future locations of the clusters. Under such conditions, cluster merging requests can be handled through the inter-cluster communication messages in the contention channel (e.g., between cluster heads of the existing clusters). For example, clusters intending to merge can notify other clusters using the periodic inter-cluster messages. Additionally, a cluster merge confirmation can be carried by the received inter-cluster messages. It should be appreciated that the frequency of periodic messaging and repetitions can be shortly increased (e.g., to improve efficiency). Further, the cluster head negotiations can include information from the higher layers, as noted previously.

As described previously, cluster splitting can be handled through the contention and control channel within the cluster. To do so, the cluster head can signal splitting intention to followers. Potential or selected cluster heads can respond in following sub-frames using the contention channel or immediately using the data/ACK channel. It should be appreciated that the cluster heads are expected to assign adjacent PRBs to the other autonomous vehicles in their cluster. It should be further appreciated that frequency diversity, if needed, can be achieved by frequency hopping for the entire system (e.g., based on a predefined hopping pattern).

In transit, those autonomous vehicles experiencing low signal to noise ratio (SNR) can elect to change their cluster. To do so, those autonomous vehicles can notify the cluster head through the data or ACK/NACK channel, or can be timer based, depending on the embodiment. Accordingly, those autonomous vehicles can associate with a different cluster based on the beacon signal strength received from the cluster head of the different cluster. It should be appreciated that clustering information may be passed from higher layers to a scheduler in order to improve efficiency and allow for pre-emptive scheduling.

Referring now to FIGS. 10A and 10B, an on-board vehicle control system (e.g., the on-board vehicle control system 104 of FIG. 1), in operation, may perform a method 1000 for performing V2V communications by an autonomous vehicle 102 with other autonomous vehicles while in transit. As shown, the method 1000 begins with block 1002 in which the on-board vehicle control system 104 of the autonomous vehicle 102 monitors for a beacon signal from cluster heads. It should be appreciated that, in some situations, the on-board vehicle control system 104 may receive beacons from multiple cluster heads (e.g., the autonomous vehicle 102 may be in range of multiple clusters and associated cluster heads).

For example, in some embodiments, a discovery phase may be employed in which beacon signals are periodically transmitted by cluster heads as discussed in more detail below in regard to FIG. 12. In such embodiments, all cluster heads can be assumed to be time synched (e.g., using global positioning system (GPS) signals in which sub-frame boundaries are synched). Additionally, the cluster heads are configured to periodically transmit beacons in predefined locations (e.g., the center PRBs) at a predefined time (e.g., in the DL control channel) with a predefined width (e.g., 12 PRBs). Further, each cluster head can use a predefined orthogonal cover code to enable the overlaying of discovery messages in case of collisions. In some embodiments, the beacons can include a primary synchronization signal (PSS), a secondary synchronization signal (SSS), and an identifier of the cluster head, which may be embedded in a selected cover code.

Depending on the embodiment, the discovery period may be a system parameter that is redefined. In such embodiments, each cluster head can randomly select one sub-frame from a discovery period and uses a cover code based on identifier of the cluster head. For example, when joining a cluster, each incoming autonomous vehicle may be required to first listen to at least a full period of discovery beacons before deciding whether to be a cluster head or follow a specific signal from a cluster head. In such embodiments, the physical broadcast channel (PBCH) may contain DMRS signals for channel estimation for cluster selection (e.g., using predefined DMRS pattern or blind search for DMRS).

In block 1004, the on-board vehicle control system 104 determines whether one or more beacons have been received or otherwise detected. If so, the method 100 advances to block 1006 in which the on-board vehicle control system 104 determines signal measurements for each cluster head based on its corresponding beacon signal. Such signal measurements may be determined or otherwise obtain using any suitable methodology such as determining a signal-to-noise ratio (SNR) of the beacon signal or other methodology. Subsequently, in block 1008, the on-board vehicle control system 104 determines whether to join a particular cluster. For example, in some embodiments, the on-board vehicle control system 104 of the autonomous vehicle 102 may determine to join a particular cluster based on the signal measurements associated with its cluster head determined in block 1006 (e.g., the on-board vehicle control system 104 may select the cluster/cluster head having the best signal measurements, which may indicate proximity of the cluster to the autonomous vehicle 102).

If the on-board vehicle control system 104 determines to join a cluster in block 1008, the method 100 advances to block 1012 in which the on-board vehicle control system 104 transmits a contention signal to the cluster head of the selected cluster. In response to receipt of the contention signal, the cluster head receives the contention signal, resolves any contention for resources, allocates resources, and transmits allocated resource information to the requesting autonomous vehicle 102. The on-board vehicle control system 104 of the requesting autonomous vehicle 102 receives the allocated resource information in block 1014. Subsequently, in block 1016, the on-board vehicle control system 104 transmits context information to the cluster head using the resources allocated in block 1014. The context information may include any information that identifies various corresponding information about the on-board vehicle control system 104 and/or the associated autonomous vehicle 102 such as equipment identification, communication protocols, capabilities, preferences, and so forth. In embodiments in which the on-board vehicle control system 104 is switching between clusters, the on-board vehicle control system 104 may notify the new cluster head of the identity of the old cluster head in block 1018. In such embodiments, the new cluster head may communicate with the old cluster head via intra-cluster communications to facilitate transfer of context information of the on-board vehicle control system 104 from the old cluster head to the new cluster head as described in more detail below in regard to FIG. 12.

In block 1020, the on-board vehicle control system 104 determines whether to communicate with one or more other members of its cluster. If so, in block 1022, the on-board vehicle control system 104 determines whether any critical requests for communication resources have been transmitted by other members of its cluster. That is, although other members transmit their contention signal to the cluster head, the on-board vehicle control system 104 listens to those contention signals to ensure none of the present contention signals/communication requires have been identified as critical by the other cluster member(s). If the on-board vehicle control system 104 has detected one or more critical messages (e.g., either critical contention messages and/or critical communications) from other cluster members, the method 1000 advances to block 1024 in which the on-board vehicle control system 104 pauses its request for a reference period of time. In the way, the on-board vehicle control system 104 improves the efficiency of communicating critical messages within the cluster by "backing off" of communications when a critical message is detected.

If not critical message has been detected in block 1022 or after the wait period of block 1024, the method 100 advances to block 1026 in which the on-board vehicle control system 104 transmits a contention signal to the cluster head for the desired communication(s). It should be appreciated that the on-board vehicle control system 104 may request resources for a single communication or for multiple communications/messages at one time. In transmitting the contention signal, in block 1028, the on-board vehicle control system 104 determines whether any of the planned communications are critical messages (e.g., time sensitive messages or messages including important information). If so, the on-board vehicle control system 104 may form the contention signal in such a way as to identify it as a critical request for resources. For example, in some embodiments, the on-board vehicle control system 104 may transmit the contention signal using the first slot of the contention channel 402 of the sub-frame structure 400 discuss above in regard to FIG. 4.

After the on-board vehicle control system 104 has transmitted the contention signal in block 1026, the cluster head allocates resources (e.g., based on the criticality of received contention signals), allocates resources, and transmits the allocated resource information to the on-board vehicle control system 104. The on-board vehicle control system 104 receives the allocated resource information in block 1030 and may transmit communication to one or more cluster members using the received allocated resources in block 1032. It should be appreciated that such communications may be unicast transmissions or broadcast transmissions. Regardless, after the on-board vehicle control system 104 has completed the communication to the one or more other cluster members, the method 1000 loops back to block 1020 in which the on-board vehicle control system 104 determines whether to communicate with any other cluster member.

Figure 11:
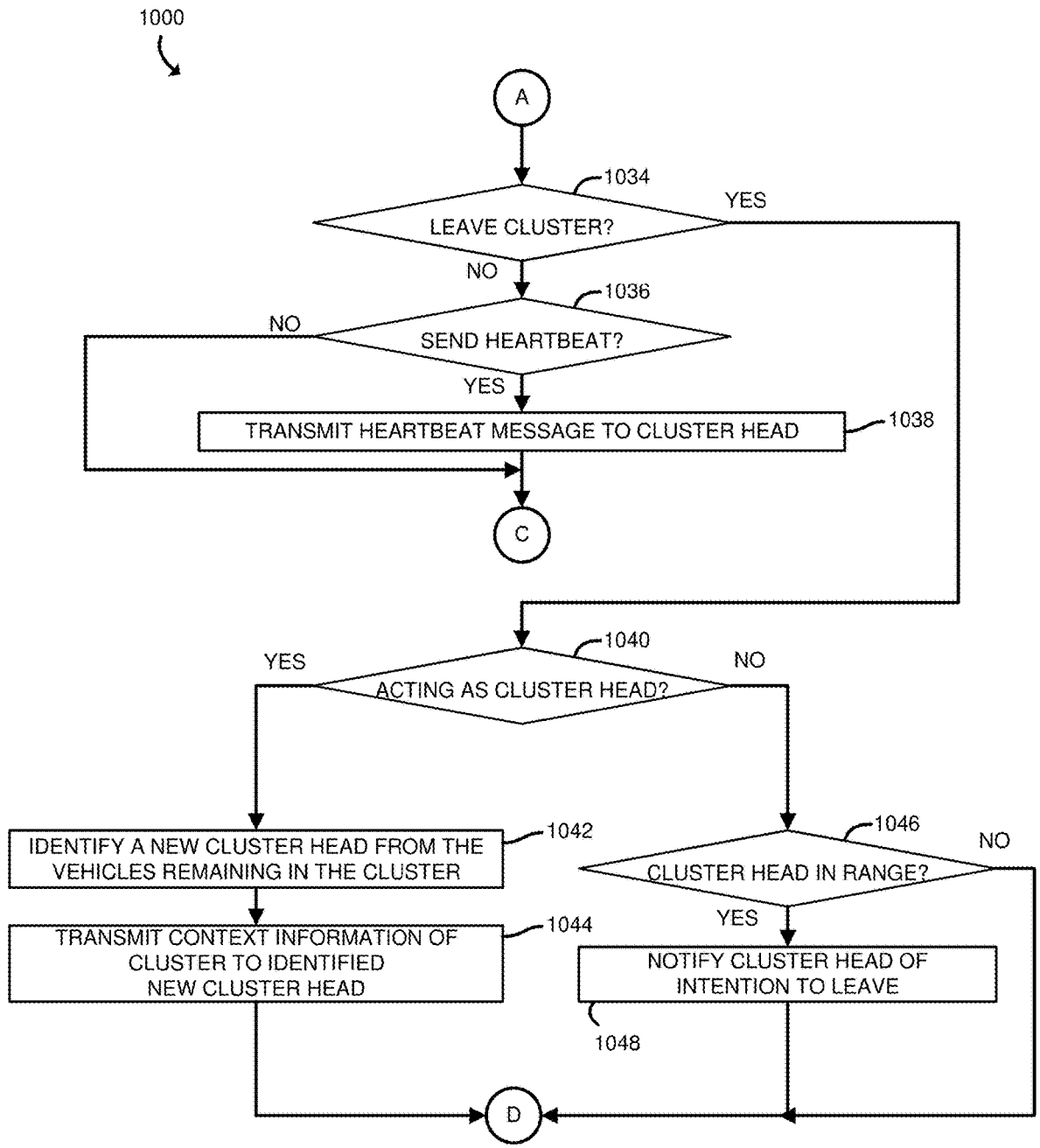

If, in block 1020, the on-board vehicle control system 104 determines no communication with one or more other cluster members is desired, the method 1000 advances to block 1034 of FIG. 11. In block 1034, the on-board vehicle control system 104 determines whether to leave its present cluster. If the on-board vehicle control system 104 determines not to leave its present cluster, the method 1000 advances to block 1036 in which the on-board vehicle control system 104 determines whether to transmit a heartbeat to the cluster head (i.e., if it is not the cluster head). If so, the on-board vehicle control system 104 transmits a heartbeat message to the cluster head in block 1038. In this way, each cluster member is configured to periodically send a heat beat message, which may be embodied as a null contention request, to the cluster head to inform the cluster head that it is still a member of the cluster. As discussed in more detail below in regard to FIG. 12, a cluster head may be configured to remove a cluster member if that particular cluster member has not communicated for a reference period of time. As such, each cluster member may be configured to periodically transmit heartbeat messages to the cluster head to inform the cluster head it is still a member of the cluster.

Figure 10:
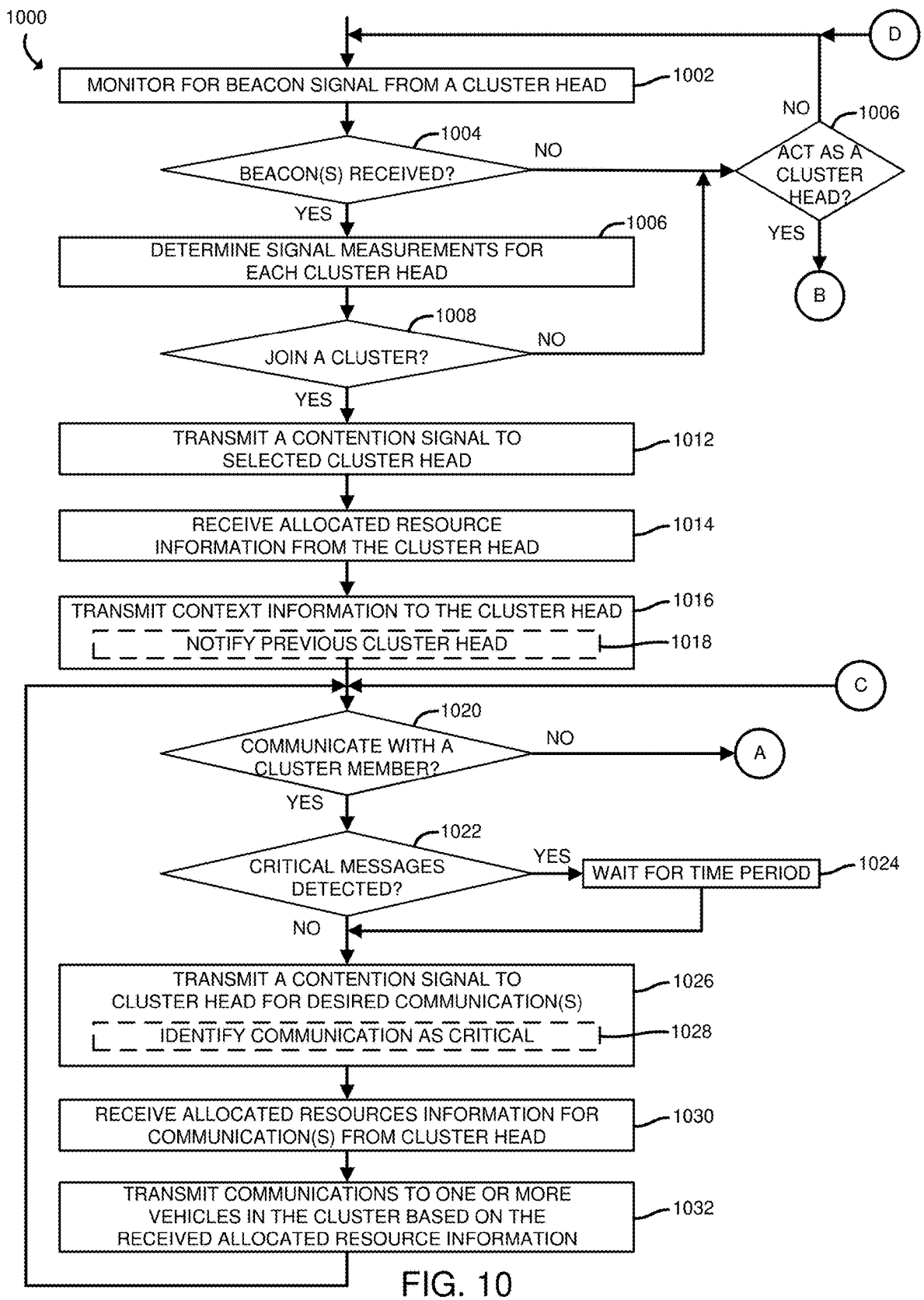
FIGS. 10-12 are a simplified flow diagram of at least one embodiment of a method for performing V2V communications by an autonomous vehicle with other autonomous vehicles while in transit.

After the on-board vehicle control system 104 has transmitted the heart beat message in block 1038 or if the on-board vehicle control system 104 determines that no heartbeat message is required at that time (e.g., the reference time period has not elapsed), the method 1000 loops back to block 1020 of FIG. 10. As discussed above, in block 1020, the on-board vehicle control system 104 the on-board vehicle control system 104 determines whether to communicate with one or more other members of its cluster.

Referring back to block 1034, if the on-board vehicle control system 104 determines to leave its present cluster, the method 1000 advances to block 1040. In block 1040, the on-board vehicle control system 104 determines whether the autonomous vehicle 102 is presently acting as the cluster head. If so, the method 1000 advances to block 1042 in which the on-board vehicle control system 104 identifies a new cluster head from the autonomous vehicles remaining in the present cluster. Additionally, in block 1044, the on-board vehicle control system 104 transmits context information of the other vehicles remaining in the cluster to the identified new cluster head. After the context information has been transferred to the new cluster head, the method 1000 loops back to block 1002 in which the on-board vehicle control system 104 of the autonomous vehicle 102 again monitors for a beacon signal from cluster heads.

Referring back to block 1040, if the autonomous vehicle 102 is not presently acting as the cluster head, the method 1000 advances to block 1046. In block 1046, the on-board vehicle control system 104 determines whether the present cluster head is within communication range. If so, the method 100 advances to block 1048 in which the on-board vehicle control system 104 notifies the present cluster head of the intention of the autonomous vehicle to leave the present cluster. Once the on-board vehicle control system 104 has notified the cluster head or if the cluster head is out of range, the method 1000 loops back to block 1002 in which the on-board vehicle control system 104 of the autonomous vehicle 102 again monitors for a beacon signal from cluster heads.

Referring back to FIG. 10, if the on-board vehicle control system 104 determines that no beacon signal has been received from a cluster head in block 1004 or if the on-board vehicle control system 104 has decided not to join any cluster, the method 100 advance to block 1006. In block 1006, the on-board vehicle control system 104 determines whether the associated autonomous vehicle 102 is to act as a cluster head. For example, the on-board vehicle control system 104 determine to configure the autonomous vehicle 102 as cluster head if no other cluster is available or if available clusters have poor signal measurements, which may indicate such clusters are remote from the autonomous vehicle 102. If the on-board vehicle control system 104 determines not to act as a cluster head, the method 1000 loop back to block 1002 in which the on-board vehicle control system 104 of the autonomous vehicle 102 again monitors for a beacon signal from cluster heads.

Figure 12:
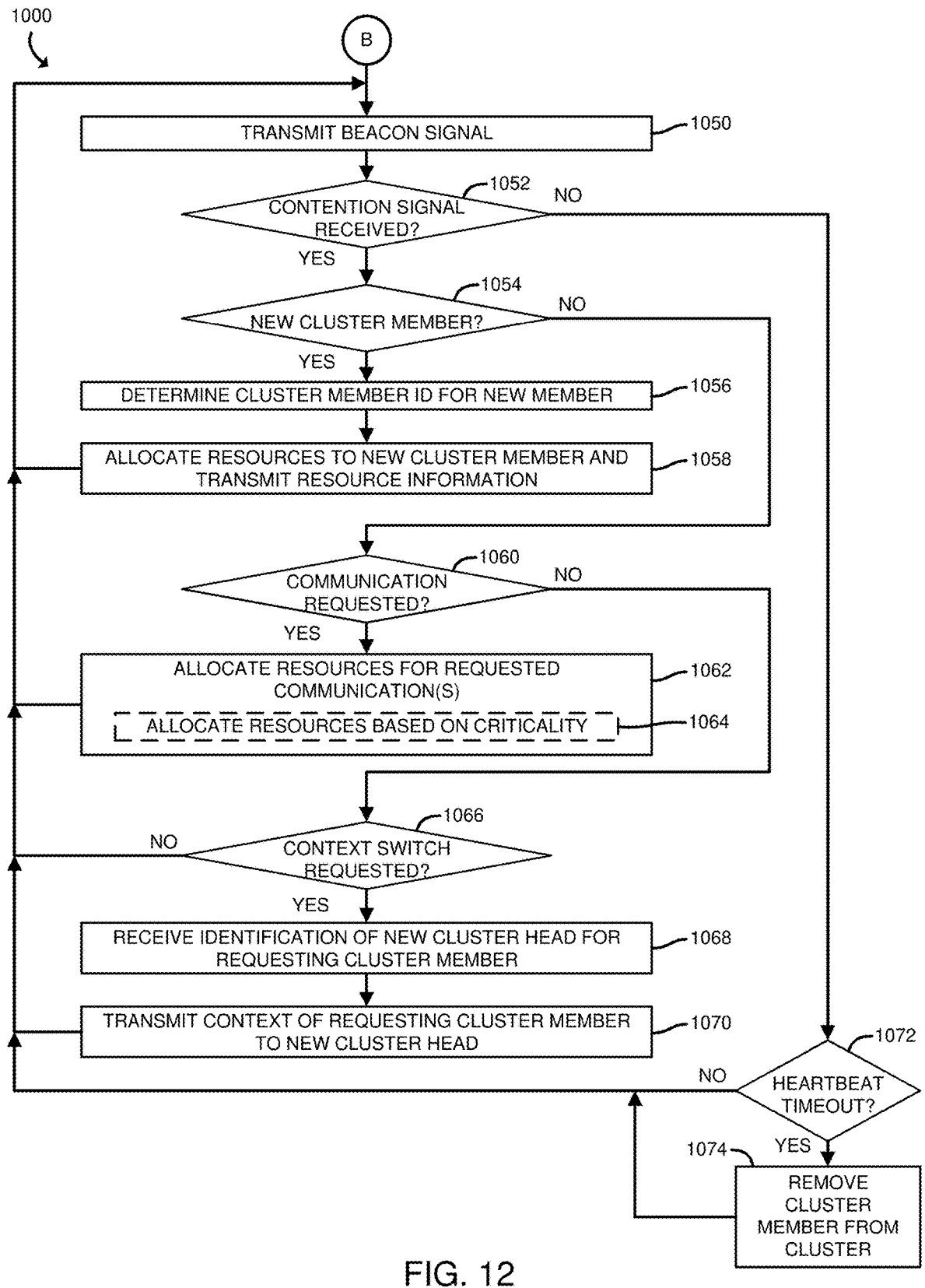

If, however, the on-board vehicle control system 104 determines the associated autonomous vehicle 102 is to act as a cluster head, the method 100 advances to block 1050 of FIG. 12. In block 1050, the on-board vehicle control system 104 begins transmitting a beacon signal. As discussed above, the beacon signal provides an indication to potential cluster members that the autonomous vehicle 102 is acting as a cluster head and can accept new cluster members. The on-board vehicle control system 104 may transmit the beacon signal periodically as discussed above.

In block 1052, the on-board vehicle control system 104 determines whether any contention signals have been received. If so, the on-board vehicle control system 104 determines whether the contention signal is from a new cluster member (i.e., a request to join the cluster). If so, the method 100 advances to block 1056 in which the on-board vehicle control system 104 determines a cluster member identification (ID) for the new cluster member. To do so, the on-board vehicle control system 104 may assign the cluster member ID based on the sequence of OFDM symbols used by the new cluster member, the location of the OFDM symbols in the frequency domain (e.g., which PRB's are used) in the contention channel 402, the location of the OFDM symbols in the time domain (e.g., which time slots is used in the contention channel 402. In this way, the on-board vehicle control system 104 generates a pseudo-random identifier for each new member. After the on-board vehicle control system 104 has generated the cluster member identification for the new cluster member, the on-board vehicle control system 104 resolves any contention for resources, assigns a set of resources for the new cluster member, and transmits the allocated resource information to the new cluster member in block 1058. The new cluster member 1058 may subsequently use the allocated resource information to transmit its context information, for example. Regardless, after the on-board vehicle control system 104 has transmitted the allocated resource information to the new cluster member, the method 100 loops back to block 1050 in which the on-board vehicle control system 104 continues to transmit the beacon signal.

Referring back to block 1054, if the on-board vehicle control system 104 determines that the received contention signal is from an existing cluster member, the method 1000 advances to block 1060. In block 1060, the on-board vehicle control system 104 determines whether the cluster member is requesting resources for a communication. If so, the method 1000 advances to block 1062 in which the on-board vehicle control system 104 resolves any contention for resources, assigns a set of resources for the requesting cluster member, and transmits the allocated resource information to the requesting cluster member in block 1062. In doing so, the on-board vehicle control system 104 may assign the resources based on the criticality of the contention request in block 1064. After the on-board vehicle control system 104 has assigned the resources in block 1062, the method 1000 loops back to block 1050 in which the on-board vehicle control system 104 continues to transmit the beacon signal.

Referring back to block 1060, if the on-board vehicle control system 104 determines that the received contention signal is not a communication request, the method 1000 advances to block 1066. In block 1066, the on-board vehicle control system 104 determines whether the a context switch has been requested. For example, a cluster member may decide to leave and request the present cluster head to transmit the context of the cluster member to a new cluster head. If so, the method 1000 advances to block 1068 in which the on-board vehicle control system 104 receives identification information of the new cluster head from the requesting cluster member. Subsequently, in block 1070, the on-board vehicle control system 104 communicates with the new cluster member using the received identification information and transmits the context of the requesting cluster member. The method 1000 subsequently loops back to block 1050 in which the on-board vehicle control system 104 continues to transmit the beacon signal.

In some embodiments, the context switch request may come directly from another cluster head. Such inter-cluster communication may be performed by a request from the new cluster head being transmitted on the contention channel, and the response from the original cluster head being transmitted on the control channel. Depending on certain conditions, the communication request message can be sent over the contention channel using either a reserved Zadoff-Chu (ZC) sequence or a predefined payload. Under such conditions in which case the communication request message is sent over the contention channel using the reserved ZC sequence, once the receiving autonomous vehicle identifies the reserved sequence, the receiving autonomous vehicle decodes the received payload to identify the request from the channel. The received message can then be used to identify the channel request (e.g., a resource coordination or a merging request). As described previously, the response is transmitted in the control channel (e.g., in a predefined location or based on a random identifier inferred from the contention channel) and should be scrambled with the random identifier. It should be appreciated that, in case of merging, the following autonomous vehicle information of the merging clusters can be piggybacked in the data.

Referring back to block 1052, if the on-board vehicle control system 104 determines that no contention signal has been received, the method 1000 advances to block 1072. In block 1072, the on-board vehicle control system 104 determines whether any cluster member has a heartbeat timeout. That is, the on-board vehicle control system 104 determines whether any cluster member has failed to communicate within a reference time period. If so, the method 1000 advances to block 1074 in which the on-board vehicle control system 104 removes the cluster member from the cluster. The method 1000 subsequently loops back to block 1050 in which the on-board vehicle control system 104 continues to transmit the beacon signal.

It should be appreciated that although the autonomous vehicle 102 associated with the on-board vehicle control system 104 is presently acting as the cluster head, the autonomous vehicle 102 may leave that cluster if desired. To do so, the on-board vehicle control system 104 may executed blocks 1040-1044 described above.

Furthermore, it should be appreciated that, depending on the conditions, an autonomous vehicle 102 attempting to access a cluster head can trigger another access attempt to neighboring cluster heads if they are sharing the same contention resources (e.g., if the neighboring clusters are not coordinating). As such, it should be understood that the autonomous vehicle 102 will eventually respond to the resources assigned in the desired cluster head control channel and the resources assigned by the other cluster head will be wasted. Further, the autonomous vehicle 102 will eventually get two resource assignments from the desired and neighboring control channel.

Accordingly, the on-board vehicle control system 104 of the autonomous vehicle 102 should be configured to transmit the UL data to the desired cluster head using the resources assigned to the autonomous vehicle by the desired cluster head. Additionally, the on-board vehicle control system 104 should be configured to transmit a control message to the neighboring cluster indicating the presence of a neighboring interfering cluster head. If the assigned resources are coinciding on the same PRBs, the on-board vehicle control system 104 can be configured to select whether to send the data in the UL data channel or a control message indicating the presence of neighboring clusters. For example, the on-board vehicle control system 104 may be configured to make the selection based on a priority of data being transmitted. Alternatively, the on-board vehicle control system 104 can elect to send the data with a notification of the presence of conflicting cluster head in a MAC control element in the MAC header of the message.

EXAMPLES

Illustrative examples of the technologies disclosed herein are provided below. An embodiment of the technologies may include any one or more, and any combination of, the examples described below.

Example 1 includes an on-board vehicle control system of an autonomous vehicle for facilitating vehicle-to-vehicle (V2V) communications, the on-board vehicle control system comprising a compute engine to identify one or more autonomous vehicles with which to communicate, wherein the one or more autonomous vehicles comprises a cluster of autonomous vehicles; and transmit a communication frame usable to indicate that the autonomous vehicle intends to join the cluster of autonomous vehicles, wherein the communication frame is comprised of a structure that includes a contention channel, a control channel, and a data channel.

Example 2 includes the subject matter of Example 1, and wherein to identify one or more autonomous vehicles with which to communicate comprises to identify which of the one or more autonomous vehicles of the cluster is a cluster head; receive a discovery beacon from the cluster head; and receive, from the cluster head, an indication of resources allocated to the on-board vehicle control system, wherein the indication of resources allocated is usable to transmit V2V communications across the one or more autonomous vehicles of the cluster.

Example 3 includes the subject matter of any of Examples 1 and 2, and wherein the received discovery beacon includes a primary synchronization signal (PSS), a secondary synchronization signal (SSS), a physical broadcast channel (PBCH) for system parameters, one or more embedded DMRS signals for channel estimation, and an identifier of the cluster head.

Example 4 includes the subject matter of any of Examples 1-3, and wherein to transmit the communication frame comprises to transmit the communication frame with a response that indicates whether the autonomous vehicle intends to follow a specific signal from an existing cluster head of the cluster.

Example 5 includes the subject matter of any of Examples 1-4, and wherein the compute engine is further to transmit a subsequent communication frame using the indication of resources allocated to the on-board vehicle control system, wherein the subsequent communication frame includes the contention channel, the control channel, and the data channel, and wherein data channel includes data indicative of a context of the on-board vehicle control system or the autonomous vehicle.

Example 6 includes the subject matter of any of Examples 1-5, and wherein to receive the discovery beacon comprises to receive the discovery beacon in a predefined location of another communication frame at a predefined time, with a predefined width.

Example 7 includes the subject matter of any of Examples 1-6, and wherein the predefined location comprises one or more center physical resource blocks (PRBs) of the other communication frame, wherein the predefined time comprises a downlink control channel other communication frame, and wherein the predefined width comprises twelve PRBs other communication frame.

Example 8 includes the subject matter of any of Examples 1-7, and wherein to transmit the communication frame comprises to transmit the communication frame with a response that indicates whether the autonomous vehicle intends to function as a new cluster head of the cluster of autonomous vehicles.

Example 9 includes a method for facilitating vehicle-to-vehicle (V2V) communications, the method comprising identifying, by an on-board vehicle control system of an autonomous vehicle, one or more autonomous vehicles with which to communicate, wherein the one or more autonomous vehicles comprises a cluster of autonomous vehicles; transmitting, by the on-board vehicle control system, a communication frame usable to indicate that the autonomous vehicle intends to join the cluster of autonomous vehicles, wherein the communication frame is comprised of a structure that includes a contention channel, a control channel, and a data channel.

Example 10 includes the subject matter of Example 9, and wherein identifying one or more autonomous vehicles with which to communicate comprises to identifying which of the one or more autonomous vehicles of the cluster is a cluster head; receiving a discovery beacon from the cluster head; and receiving, from the cluster head, an indication of resources allocated to the on-board vehicle control system, wherein the indication of resources allocated is usable to transmit V2V communications across the one or more autonomous vehicles of the cluster.

Example 11 includes the subject matter of any of Examples 9 and 10, and wherein the received discovery beacon includes a primary synchronization signal (PSS), a secondary synchronization signal (SSS), a physical broadcast channel (PBCH) for system parameters, one or more embedded DMRS signals for channel estimation, and an identifier of the cluster head.

Example 12 includes the subject matter of any of Examples 9-11, and wherein transmitting the communication frame comprises transmitting the communication frame with a response that indicates whether the autonomous vehicle intends to follow a specific signal from an existing cluster head of the cluster.

Example 13 includes the subject matter of any of Examples 9-12, and further including transmitting, by the on-board vehicle control system, a subsequent communication frame using the indication of resources allocated to the on-board vehicle control system, wherein the subsequent communication frame includes the contention channel, the control channel, and the data channel, and wherein data channel includes data indicative of a context of the on-board vehicle control system or the autonomous vehicle.

Example 14 includes the subject matter of any of Examples 9-13, and wherein receiving the discovery beacon comprises receiving the discovery beacon in a predefined location of another communication frame at a predefined time, with a predefined width.

Example 15 includes the subject matter of any of Examples 9-14, and wherein the predefined location comprises one or more center physical resource blocks (PRBs) of the other communication frame, wherein the predefined time comprises a downlink control channel other communication frame, and wherein the predefined width comprises twelve PRBs other communication frame.

Example 16 includes the subject matter of any of Examples 9-15, and wherein transmitting the communication frame comprises transmitting the communication frame with a response that indicates whether the autonomous vehicle intends to function as a new cluster head of the cluster of autonomous vehicles.

Example 17 includes one or more machine-readable storage media comprising a plurality of instructions stored thereon that, when executed, cause an on-board vehicle control system of an autonomous vehicle to identify one or more autonomous vehicles with which to communicate, wherein the one or more autonomous vehicles comprises a cluster of autonomous vehicles; transmit a communication frame usable to indicate that the autonomous vehicle intends to join the cluster of autonomous vehicles, wherein the communication frame is comprised of a structure that includes a contention channel, a control channel, and a data channel.

Example 18 includes the subject matter of Example 17, and wherein to identify one or more autonomous vehicles with which to communicate comprises to identify which of the one or more autonomous vehicles of the cluster is a cluster head; receive a discovery beacon from the cluster head; and receive, from the cluster head, an indication of resources allocated to the on-board vehicle control system, wherein the indication of resources allocated is usable to transmit V2V communications across the one or more autonomous vehicles of the cluster.

Example 19 includes the subject matter of any of Examples 17 and 18, and wherein the received discovery beacon includes a primary synchronization signal (PSS), a secondary synchronization signal (SSS), a physical broadcast channel (PBCH) for system parameters, one or more embedded DMRS signals for channel estimation, and an identifier of the cluster head.

Example 20 includes the subject matter of any of Examples 17-19, and wherein to transmit the communication frame comprises to transmit the communication frame with a response that indicates whether the autonomous vehicle intends to follow a specific signal from an existing cluster head of the cluster.

Example 21 includes the subject matter of any of Examples 17-20, and wherein the plurality of instructions, when executed, further cause the on-board vehicle control system to transmit a subsequent communication frame using the indication of resources allocated to the on-board vehicle control system, wherein the subsequent communication frame includes the contention channel, the control channel, and the data channel, and wherein data channel includes data indicative of a context of the on-board vehicle control system or the autonomous vehicle.

Example 22 includes the subject matter of any of Examples 17-21, and wherein to receive the discovery beacon comprises to receive the discovery beacon in a predefined location of another communication frame at a predefined time, with a predefined width.

Example 23 includes the subject matter of any of Examples 17-22, and wherein the predefined location comprises one or more center physical resource blocks (PRBs) of the other communication frame, wherein the predefined time comprises a downlink control channel other communication frame, and wherein the predefined width comprises twelve PRBs other communication frame.

Example 24 includes the subject matter of any of Examples 17-23, and wherein to transmit the communication frame comprises to transmit the communication frame with a response that indicates whether the autonomous vehicle intends to function as a new cluster head of the cluster of autonomous vehicles.

The invention claimed is:

1. An on-board vehicle control system of an autonomous vehicle for facilitating vehicle-to-vehicle (V2V) communications, the on-board vehicle control system comprising: a compute engine to: identify one or more autonomous vehicles with which to communicate, wherein the one or more autonomous vehicles comprises a cluster of autonomous vehicles; and transmit a communication frame usable to indicate that the autonomous vehicle intends to join the cluster of autonomous vehicles, wherein to identify the one or more autonomous vehicles with which to communicate comprises to: identify which of the one or more autonomous vehicles of the cluster is a cluster head; receive a discovery beacon from the cluster head; and receive, from the cluster head, an indication of resources allocated to the on-board vehicle control system, wherein the indication of resources allocated is usable to transmit the V2V communications across the one or more autonomous vehicles of the cluster wherein the compute engine is further to: monitor for signals received from other autonomous vehicles; determine, based on a strength of the signals received from the other autonomous vehicles, that the autonomous vehicle is to function as a new cluster head of a second cluster of autonomous vehicles; and transmit, in response to the determination that the autonomous vehicle is to function as the new cluster head, a beacon signal that provides an indication to potential members of the second cluster that the autonomous vehicle is acting as the new cluster head and configured to accept new members to the second cluster of autonomous vehicles.

2. The on-board vehicle control system of claim 1, wherein the received discovery beacon includes a primary synchronization signal (PSS), a secondary synchronization signal (SSS), a physical broadcast channel (PBCH) for system parameters, one or more embedded demodulated reference signals for channel estimation, and an identifier of the cluster head.

3. The on-board vehicle control system of claim 1, wherein to transmit the communication frame comprises to transmit the communication frame with a response that indicates whether the autonomous vehicle intends to follow a specific signal from an existing cluster head of the cluster.

4. The on-board vehicle control system of claim 1, wherein the compute engine is further to transmit a subsequent communication frame using the indication of resources allocated to the on-board vehicle control system, wherein the subsequent communication frame includes a contention channel, a control channel, and a data channel, and wherein the data channel includes data indicative of a context of the on-board vehicle control system or the autonomous vehicle.

5. The on-board vehicle control system of claim 1, wherein to receive the discovery beacon comprises to receive the discovery beacon in a predefined location of another communication frame at a predefined time, with a predefined width.

6. The on-board vehicle control system of claim 5, wherein the predefined location comprises one or more center physical resource blocks (PRBs) of the other communication frame, wherein the predefined time defines a time in a downlink control channel, and wherein the predefined width comprises twelve PRBs in the other communication frame.

7. The on-board vehicle control system of claim 1, wherein to transmit the communication frame comprises to transmit the communication frame with a response that indicates whether the autonomous vehicle intends to function as a new cluster head of the cluster of autonomous vehicles.

8. The on-board vehicle control system of claim 1, wherein the compute engine is further to transmit a resource request over a contention channel, wherein to receive the indication of resources allocated to the on-board vehicle control system comprises to receive the indication of resources allocated over a control channel in response to a resource request, wherein the compute engine is further to transmit data over a data channel based on the indication of resources allocated.

9. The on-board vehicle control system of claim 8, wherein an amount of time between a beginning of transmission of the resource request and an end of transmission of the data is less than one millisecond.

10. A method for facilitating vehicle-to-vehicle (V2V) communications, the method comprising: identifying, by an on-board vehicle control system of an autonomous vehicle, one or more autonomous vehicles with which to communicate, wherein the one or more autonomous vehicles comprises a cluster of autonomous vehicles; transmitting, by the on-board vehicle control system, a communication frame usable to indicate that the autonomous vehicle intends to join the cluster of autonomous vehicles, wherein the communication frame is comprised of a structure that includes a contention channel, a control channel, and a data channel, wherein identifying the one or more autonomous vehicles with which to communicate comprises: identifying which of the one or more autonomous vehicles of the cluster is a cluster head; receiving a discovery beacon from the cluster head; and receiving, from the cluster head, an indication of resources allocated to the on-board vehicle control system, wherein the indication of resources allocated is usable to transmit the V2V communications across the one or more autonomous vehicles of the cluster wherein receiving the indication of resources allocated to the on-board vehicle control system comprises receiving the indication of resources allocated over a control channel in response to a resource request, the method further comprising transmitting, by the on-board vehicle control system, data over a data channel based on the indication of resources allocated.

11. The method of claim 10, wherein the received discovery beacon includes a primary synchronization signal (PSS), a secondary synchronization signal (SSS), a physical broadcast channel (PBCH) for system parameters, one or more embedded demodulated reference signals for channel estimation, and an identifier of the cluster head.

12. The method of claim 10, wherein transmitting the communication frame comprises transmitting the communication frame with a response that indicates whether the autonomous vehicle intends to follow a specific signal from an existing cluster head of the cluster.

13. The method of claim 10, further comprising transmitting, by the on-board vehicle control system, a subsequent communication frame using the indication of resources allocated to the on-board vehicle control system, wherein the subsequent communication frame includes the contention channel, the control channel, and the data channel, and wherein the data channel includes data indicative of a context of the on-board vehicle control system or the autonomous vehicle.

14. The method of claim 10, wherein receiving the discovery beacon comprises receiving the discovery beacon in a predefined location of another communication frame at a predefined time, with a predefined width.

15. One or more non-transitory machine-readable storage media comprising a plurality of instructions stored thereon that, when executed, cause an on-board vehicle control system of an autonomous vehicle to: identify one or more autonomous vehicles with which to communicate, wherein the one or more autonomous vehicles comprises a cluster of autonomous vehicles; transmit a communication frame usable to indicate that the autonomous vehicle intends to join the cluster of autonomous vehicles, wherein the communication frame is comprised of a structure that includes a contention channel, a control channel, and a data channel; monitor for signals received from other autonomous vehicles; determine, based on a strength of the signals received from the other autonomous vehicles, that the autonomous vehicle is to function as a new cluster head of a second cluster of autonomous vehicles; and transmit, in response to the determination that the autonomous vehicle is to function as the new cluster head, a beacon signal that provides an indication to potential members of the second cluster that the autonomous vehicle is acting as the new cluster head and configured to accept new members to the second cluster of autonomous vehicles, wherein to identify one or more autonomous vehicles with which to communicate comprises to: identify which of the one or more autonomous vehicles of the cluster is a cluster head; receive a discovery beacon from the cluster head; and receive, from the cluster head, an indication of resources allocated to the on-board vehicle control system, wherein the indication of resources allocated is usable to transmit vehicle-to-vehicle (V2V) communications across the one or more autonomous vehicles of the cluster.

16. The one or more non-transitory machine-readable storage media of claim 15, wherein the received discovery beacon includes a primary synchronization signal (PSS), a secondary synchronization signal (SSS), a physical broadcast channel (PBCH) for system parameters, one or more embedded demodulated reference signals for channel estimation, and an identifier of the cluster head.

17. The one or more non-transitory machine-readable storage media of claim 15, wherein to transmit the communication frame comprises to transmit the communication frame with a response that indicates whether the autonomous vehicle intends to follow a specific signal from an existing cluster head of the cluster.

18. The one or more non-transitory machine-readable storage media of claim 15, wherein the plurality of instructions, when executed, further cause the on-board vehicle control system to transmit a subsequent communication frame using the indication of resources allocated to the on-board vehicle control system, wherein the subsequent communication frame includes the contention channel, the control channel, and the data channel, and wherein the data channel includes data indicative of a context of the on-board vehicle control system or the autonomous vehicle.

19. The one or more non-transitory machine-readable storage media of claim 15, wherein to receive the discovery beacon comprises to receive the discovery beacon in a predefined location of another communication frame at a predefined time, with a predefined width.

20. The one or more non-transitory machine-readable storage media of claim 19, wherein the predefined location comprises one or more center physical resource blocks (PRBs) of the other communication frame, wherein the predefined time defines a time in a downlink control channel, and wherein the predefined width comprises twelve PRBs in the other communication frame.

21. The one or more non-transitory machine-readable storage media of claim 15, wherein to transmit the communication frame comprises to transmit the communication frame with a response that indicates whether the autonomous vehicle intends to function as a new cluster head of the cluster of autonomous vehicles.

22. The one or more non-transitory machine-readable storage media of claim 15, wherein the plurality of instructions further cause the on-board vehicle control system to:
receive, from a member of the second cluster of autonomous vehicles, a context switch request, wherein the context switch request indicates that the member is leaving the second cluster to join a third cluster of autonomous vehicles; and
transmit context of the member to a cluster head of the third cluster in response to receipt of the context switch request.

23. The one or more non-transitory machine-readable storage media of claim 15, wherein the plurality of instructions further cause the on-board vehicle control system to: determine that the autonomous vehicle is to leave the second cluster; identify, in response to a determination that the autonomous vehicle is to leave the second cluster, a new cluster head of the second cluster; and transmit, in response to the determination that the autonomous vehicle is to leave the second cluster, context information of each autonomous vehicle in the second cluster to the new cluster head of the second cluster.

24. The one or more non-transitory machine-readable storage media of claim 15, wherein the plurality of instructions further cause the on-board vehicle control system to:
transmit a sync block in a sync channel physical resource block (PRB) at a first time; and
listen for a sync block in the sync channel PRB from the cluster head at a second time different from the first time.

* * * * *